United States Patent
Ingale et al.

(10) Patent No.: US 11,954,713 B2
(45) Date of Patent: Apr. 9, 2024

(54) VARIABLE REFRIGERANT FLOW SYSTEM WITH ELECTRICITY CONSUMPTION APPORTIONMENT

(71) Applicant: Johnson Controls Tyco IP Holdings LLP, Milwaukee, WI (US)

(72) Inventors: Anupam Ajit Ingale, Maharashatra (IN); Ankur Thareja, Rajasthan (IN); Subrata Bhattacharya, Navi Mumbai (IN); Prasanna Bari, Maharashtra (IN); Braja Majumdar, West Bengal (IN); Tousif H. Khan, Maharashtra (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 1158 days.

(21) Appl. No.: 15/920,077

(22) Filed: Mar. 13, 2018

(65) Prior Publication Data
US 2019/0287147 A1 Sep. 19, 2019

(51) Int. Cl.
G06Q 30/04 (2012.01)
F24F 11/83 (2018.01)
(Continued)

(52) U.S. Cl.
CPC ............. *G06Q 30/04* (2013.01); *F24F 11/83* (2018.01); *F25B 49/022* (2013.01); *G05B 15/02* (2013.01);
(Continued)

(58) Field of Classification Search
CPC ........ G06Q 30/04; G06Q 50/06; G05B 15/02; F24F 2140/60; F24F 11/83; F25B 13/00; F25B 2500/19; F24B 2400/06
(Continued)

(56) References Cited

U.S. PATENT DOCUMENTS

| 5,301,109 A | 4/1994 | Landauer et al. |
| 5,446,677 A | 8/1995 | Jensen et al. |

(Continued)

FOREIGN PATENT DOCUMENTS

| CN | 101415011 A | 4/2009 |
| CN | 101464025 A | 6/2009 |

(Continued)

OTHER PUBLICATIONS

Fujitsu General Limited, Electricity Charge Apportionment Tool for Touch Panel Controller Instruction Manual, 2015, 117 pages.
(Continued)

*Primary Examiner* — Md Abul Azad
(74) *Attorney, Agent, or Firm* — Foley & Lardner LLP

(57) ABSTRACT

A variable refrigerant flow system for a building includes a plurality of indoor units, a first outdoor unit, an outdoor meter, and a variable refrigerant flow management system. The plurality of indoor units configured to generate activation requests. The first outdoor unit is configured to receive the activation requests and, in response to the activation requests, provide a refrigerant to the plurality of indoor units. The outdoor meter is configured to provide an outdoor unit electricity consumption measurement. The variable refrigerant flow management system is configured to receive the outdoor unit electricity consumption measurement and activation data indicating the activation requests and apportion an outdoor share of the outdoor electricity consumption measurement to each of the plurality of indoor units based on the activation data.

17 Claims, 11 Drawing Sheets

(51) Int. Cl.
| | |
|---|---|
| *F24F 140/60* | (2018.01) |
| *F25B 13/00* | (2006.01) |
| *F25B 49/02* | (2006.01) |
| *G05B 15/02* | (2006.01) |
| *G06Q 50/06* | (2012.01) |

(52) U.S. Cl.
CPC .......... *G06Q 50/06* (2013.01); *F24F 2140/60* (2018.01); *F25B 13/00* (2013.01); *F25B 2313/007* (2013.01); *F25B 2313/0231* (2013.01); *F25B 2313/0233* (2013.01); *F25B 2400/06* (2013.01); *F25B 2500/19* (2013.01); *F25B 2600/0253* (2013.01)

(58) Field of Classification Search
USPC ........................................................ 700/2
See application file for complete search history.

(56) References Cited

U.S. PATENT DOCUMENTS

| | | | |
|---|---|---|---|
| 5,581,478 | A | 12/1996 | Cruse et al. |
| 5,812,962 | A | 9/1998 | Kovac |
| 5,960,381 | A | 9/1999 | Singers et al. |
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,229,470 | B1 | 7/2012 | Ranjan et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | MacKay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,753,455 | B2 | 9/2017 | Drees |
| 9,811,249 | B2 | 11/2017 | Chen et al. |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,169,454 | B2 | 1/2019 | Ait-Mokhtar et al. |
| 10,171,586 | B2 | 1/2019 | Shaashua et al. |
| 10,187,258 | B2 | 1/2019 | Nagesh et al. |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,705,492 | B2 | 7/2020 | Harvey |
| 10,708,078 | B2 | 7/2020 | Harvey |
| 10,845,771 | B2 | 11/2020 | Harvey |
| 10,854,194 | B2 | 12/2020 | Park et al. |
| 10,862,928 | B1 | 12/2020 | Badawy et al. |
| 10,921,760 | B2 | 2/2021 | Harvey |
| 10,921,972 | B2 | 2/2021 | Park et al. |
| 10,969,133 | B2 | 4/2021 | Harvey |
| 10,986,121 | B2 | 4/2021 | Stockdale et al. |
| 11,016,998 | B2 | 5/2021 | Park et al. |
| 11,024,292 | B2 | 6/2021 | Park et al. |
| 11,038,709 | B2 | 6/2021 | Park et al. |
| 11,070,390 | B2 | 7/2021 | Park et al. |
| 11,073,976 | B2 | 7/2021 | Park et al. |
| 11,108,587 | B2 | 8/2021 | Park et al. |
| 11,113,295 | B2 | 9/2021 | Park et al. |
| 11,229,138 | B1 | 1/2022 | Harvey et al. |
| 11,314,726 | B2 | 4/2022 | Park et al. |
| 11,314,788 | B2 | 4/2022 | Park et al. |
| 2002/0010562 | A1 | 1/2002 | Schleiss et al. |
| 2002/0016639 | A1 | 2/2002 | Smith et al. |
| 2002/0059229 | A1 | 5/2002 | Natsumeda et al. |
| 2002/0123864 | A1 | 9/2002 | Eryurek et al. |
| 2002/0147506 | A1 | 10/2002 | Eryurek et al. |
| 2002/0177909 | A1 | 11/2002 | Fu et al. |
| 2003/0005486 | A1 | 1/2003 | Ridolfo et al. |
| 2003/0014130 | A1 | 1/2003 | Grumelart |
| 2003/0073432 | A1 | 4/2003 | Meade, II |
| 2003/0158704 | A1 | 8/2003 | Triginai et al. |
| 2003/0171851 | A1 | 9/2003 | Brickfield et al. |
| 2003/0200059 | A1 | 10/2003 | Ignatowski et al. |
| 2004/0068390 | A1 | 4/2004 | Saunders |
| 2004/0128314 | A1 | 7/2004 | Katibah et al. |
| 2004/0133314 | A1 | 7/2004 | Ehlers et al. |
| 2004/0199360 | A1 | 10/2004 | Friman et al. |
| 2005/0055308 | A1 | 3/2005 | Meyer et al. |
| 2005/0097902 | A1* | 5/2005 | Kwon .................... F24F 11/30 62/126 |
| 2005/0108262 | A1 | 5/2005 | Fawcett et al. |
| 2005/0154494 | A1 | 7/2005 | Ahmed |
| 2005/0278703 | A1 | 12/2005 | Lo et al. |
| 2005/0283337 | A1 | 12/2005 | Sayal |
| 2006/0095521 | A1 | 5/2006 | Patinkin |
| 2006/0140207 | A1 | 6/2006 | Eschbach et al. |
| 2006/0184479 | A1 | 8/2006 | Levine |

(56) References Cited

U.S. PATENT DOCUMENTS

| | | |
|---|---|---|
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0142607 A1* | 6/2008 | Yoshii ............... F24F 11/30 236/51 |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | MacKay et al. |
| 2011/0087988 A1 | 4/2011 | Ray et al. |
| 2011/0088000 A1 | 4/2011 | MacKay |
| 2011/0125737 A1 | 5/2011 | Pothering et al. |
| 2011/0137853 A1 | 6/2011 | MacKay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | MacKay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0238061 A1 | 8/2014 | Shimamoto et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2014/0345826 A1 | 11/2014 | Kim et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0211758 A1* | 7/2015 | Macek ............... G05B 13/026 700/278 |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0377309 A1* | 12/2016 | Abiprojo ............... G05B 19/042 700/276 |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |

(56) References Cited

U.S. PATENT DOCUMENTS

| | | |
|---|---|---|
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0004173 A1 | 1/2018 | Patel et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gartner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 102136099 A | 7/2011 |
| CN | 102136100 A | 7/2011 |
| CN | 102650876 A | 8/2012 |
| CN | 103124879 A | 5/2013 |
| CN | 103202034 A | 7/2013 |
| CN | 104040583 A | 9/2014 |
| CN | 104603832 A | 5/2015 |
| CN | 104919484 A | 9/2015 |
| CN | 105473354 A | 4/2016 |
| CN | 106204392 A | 12/2016 |
| CN | 106406806 A | 2/2017 |
| CN | 106871475 A | 6/2017 |
| CN | 106960269 A | 7/2017 |
| CN | 107147639 A1 | 9/2017 |
| CN | 107598928 A | 1/2018 |
| EP | 1 536 186 A1 | 6/2005 |
| EP | 2 528 033 A1 | 11/2012 |
| EP | 3 324 306 A1 | 5/2018 |
| JP | H10-049552 A | 2/1998 |
| JP | 2000-234792 A | 8/2000 |
| JP | 2001-108277 A | 4/2001 |
| JP | 2003-162573 A | 6/2003 |
| JP | 2005-147651 A | 6/2005 |
| JP | 2007-018322 A | 1/2007 |
| JP | 4073946 B1 | 4/2008 |
| JP | 2008-107930 A | 5/2008 |
| JP | 2008-151443 A | 7/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

International Search Report and Written Opinion for International Application No. PCT/US2019/021878, dated Jun. 21, 2019, 14 pages.

Balaji et al., "Brick: Metadata schema for portable smart building applications," Applied Energy, 2018 (20 pages).

(56) References Cited

OTHER PUBLICATIONS

Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. Ser. No. 201780003995.9 dated Apr. 8, 2021 (21 pages).
Chinese Office action on CN Appl. Ser. No. 201780043400.2 dated Apr. 25, 2021 (15 pages).
Curry, E. et al., "Linking building data in the cloud: Integrating cross-domain building data using linked data." Advanced Engineering Informatics, 2013, 27 (pp. 206-219).
Daikin AC, "Power Proportional Distribution (PPD)," URL: http://www.daikinac.com/content/assets/Controls/Intelligent-Controller-PPD-Option-General-Product-Description.pdf, retrieved from internet Dec. 20, 2017 (10 pages).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26-Oct. 23, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics, " BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 15 pages.

(56) References Cited

OTHER PUBLICATIONS

International Search Report and Written Opinion on PCT/US2020/058381, dated Jan. 27, 2021, 30 pages.

Japanese Office Action on JP Appl. No. 2020-547334 dated Feb. 7, 2023 (10 pages).

Japanese Office Action on JP Appl. Ser. No. 2018-534963 dated May 11, 2021 (16 pages).

Koh et al., "Plaster: An Integration, Benchmark, and Development Framework for Metadata Normalization Methods," BuildSys '18, Shenzhen, China, Nov. 7-8, 2018 (10 pages).

Koh et al., "Scrabble: Transferrable Semi-Automated Semantic Metadata Normalization using Intermediate Representation," BuildSys '18, Shenzhen, China, Nov. 7-8, 2018 (10 pages).

Koh et al., "Who can Access What, and When?" BuildSys '19, New York, NY, USA, Nov. 13-14, 2019 (4 pages).

Li et al., "Event Stream Processing with Out-of-Order Data Arrival," International Conferences on Distributed Computing Systems, 2007, (8 pages).

Midea, "IMM (Intelligent Manager of Midea): 4th Generation of Network Control System, Technical Manual," URL: https://www.google.co.in/url?sa=t&rct=j&q=&esrc=s&source=web&cd=1&ved=0ahUKEwjXvpGQ4ZjYAhXJPY8KHfWRBKgQFggmMAA&url=http%3A%2F%2Fwww.mdv-russia.ruk%2Fservice%2Ftekhnicheskaya-biblioteka%2Fcategory%2F178-gateways.html%3fdownload%3D1844%3Aimm-technical-manual&usg=AOvVaw0KhIMPfjb_czGZLsOgq-VE, retrieved from Internet Dec. 20, 2017 (188 pages).

Nissin Electric Co., Ltd., "Smart power supply system (SPSS)," Outline of the scale verification plan, Nissin Electric Technical Report, Japan, Apr. 23, 2014, vol. 59, No. 1 (23 pages with English language abstract).

Passivelogic, "Explorer: Digital Twin Standard for Autonomous Systems. Made interactive." URL: https://passivelogic.com/software/quantum-explorer/, retrieved from internet Jan. 4, 2023 (13 pages).

Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, first ed. published 2020 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work for Your Business: A guide to effective Big Data analytics," Impackt Publishing LTD., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

Zhou, Q. et al., "Knowledge-infused and Consistent Complex Event Processing over Real-time and Persistent Streams," Further Generation Computer Systems, 2017, 76 (pp. 391-406).

Japanese Office Action on JP Appl. No. 2020-547334 dated Sep. 12, 2023 (8 pages with English language translation).

Chinese Office Action on CN Appl. No. 201980031607.7 dated Jan. 25, 2024 (21 pages with English language translation).

\* cited by examiner

VARIABLE REFRIGERANT FLOW SYSTEM WITH ELECTRICITY CONSUMPTION APPORTIONMENT

BACKGROUND

The present disclosure relates generally to the field of variable refrigerant flow systems, and more particularly to a method and system for apportioning electricity costs among multiple tenants of a facility served by a variable refrigerant flow system. In a variable refrigerant flow system, a refrigerant is conditioned by an outdoor condensing unit and circulated within a building to multiple indoor units, with a large portion of the electrical power consumption of the system attributable to the outdoor condensing unit.

Variable refrigerant flow systems are popular in multi-tenant buildings, such as apartment buildings, office buildings, or mixed-use facilities. For many multi-tenant buildings, electrical utility costs are billed to each tenant based on that tenant's electricity consumption, for example as determined by a meter that measures electricity consumption attributable to a tenant's unit in the building. However, because electricity consumption in a variable refrigerant flow system is largely due to the outdoor condensing unit that serves multiple tenants, a challenge exists to accurately apportion the costs of electricity consumption of the outdoor condensing unit among the tenants that it serves.

SUMMARY

One implementation of the present disclosure is a variable refrigerant flow system for a building. The variable refrigerant flow system includes a plurality of indoor units, a first outdoor unit, an outdoor meter, and a variable refrigerant flow management system. The plurality of indoor units are configured to generate activation requests. The first outdoor unit is configured to receive the activation requests and, in response to the activation requests, provide a refrigerant to the plurality of indoor units. The outdoor meter is configured to provide an outdoor unit electricity consumption measurement. The variable refrigerant flow management system is configured to receive the outdoor unit electricity consumption measurement and activation data indicating the activation requests and apportion an outdoor share of the outdoor electricity consumption measurement to each of the plurality of indoor units based on the activation data.

In some embodiments, the first outdoor unit includes a compressor and the activation data includes a compressor request frequency for each of the plurality of indoor units. In some embodiments, the variable refrigerant management system apportion each outdoor share of the outdoor electricity consumption by calculating an outdoor consumption factor for each indoor unit based on the compressor request frequency corresponding to the indoor unit, calculating a power proportional index for each indoor unit by dividing the outdoor consumption factor corresponding to the indoor unit by a sum of the outdoor consumption factors for each of the plurality of indoor units, and multiplying the power proportional index for each indoor unit by the outdoor electricity consumption measurement.

In some embodiments, the variable refrigerant flow system also includes one or more additional outdoor units configured to receive activation request. The outdoor meter measures electricity consumption for the first outdoor unit and the one or more additional outdoor units to generate the outdoor unit consumption measurement. The variable refrigerant flow management system is further configured to apportion a share of the outdoor unit consumption measurement to the first outdoor unit based on the activation requests.

In some embodiments, the first outdoor unit includes a compressor and the activation data includes compressor requests frequencies. The variable refrigerant flow management system is further configured to apportion a share of the outdoor unit consumption measurement to the first outdoor unit based on the activation requests by determining a compressor run time of the first outdoor unit, determining a compressor total frequency based on the compressor request frequencies of the activation requests received by the first outdoor unit, calculating a consumption factor of the first outdoor unit based on the average compressor total frequency and the compressor run time, calculating a power proportional index for the first outdoor unit by dividing the consumption factor of the first outdoor unit by a sum of consumption factors of the one or more additional outdoor units and the consumption factor of the first outdoor unit, and multiplying the outdoor unit consumption measurement by the power proportional index.

In some embodiments, the variable refrigerant flow system also includes an indoor meter that measures electricity consumption of the plurality of indoor units to generate an indoor electricity consumption measurement. The variable refrigerant flow management system is further configured to apportion the indoor electricity consumption measurement among the plurality of indoor units.

Another implementation of the present disclosure is a method for operating a variable refrigerant flow system for a building. The method includes generating, generating, by a plurality of indoor units, activation requests and receiving, by a first outdoor unit, the activation requests. In response to the activation requests, the first outdoor unit provides refrigerant to the plurality of indoor units. The method also includes obtaining an outdoor unit electricity consumption measurement and activation data indicating the activation requests and apportioning an outdoor share of the outdoor electricity consumption measurement to each of the plurality of indoor units based on the activation data.

In some embodiments, the first outdoor unit includes a compressor and the activation data includes a compressor request frequency for each of the plurality of indoor units. In some embodiments, apportioning an outdoor share of the outdoor electricity consumption measurement to each of the plurality of indoor units based on the activation data includes calculating an outdoor consumption factor for each indoor unit based on the compressor request frequency, calculating a power proportional index for each indoor unit by dividing the outdoor consumption factor corresponding to the indoor unit by a sum of the outdoor consumption factors for each of the plurality of indoor units, and multiplying the power proportional index for each indoor unit by the outdoor electricity consumption measurement.

In some embodiments, obtaining the outdoor electricity consumption measurement includes measuring electricity consumption for the first outdoor unit and one or more additional outdoor units to generate a total outdoor unit consumption measurement and apportioning the outdoor unit consumption measurement to the first outdoor unit as a portion of the total outdoor unit consumption measurement based on the activation data. In some embodiments, the first outdoor unit includes a compressor and the activation data includes compressor request frequencies. Apportioning the outdoor unit consumption measurement to the first outdoor unit includes determining a compressor run time of the first outdoor unit, determining a compressor total frequency based on the compressor request frequencies of the activation requests received by the first outdoor unit, calculating a consumption factor of the first outdoor unit based on the compressor total frequency and the compressor run time, calculating a power proportional index for the first outdoor unit by dividing the consumption factor of the first outdoor unit by a sum of consumption factors of the one or more additional outdoor units and the consumption factor of the first outdoor unit, and multiplying the total outdoor unit consumption measurement by the power proportional index.

In some embodiments, the method also includes obtaining an indoor electricity consumption measurement of the plurality of indoor units and apportion an indoor share of the indoor electricity consumption measurement among the plurality of indoor units. In some embodiments, attributing each indoor share of the indoor electricity consumption measurement among the plurality of indoor units includes calculating an indoor consumption factor for each indoor unit based on a runtime and a capacity corresponding to the indoor unit, calculating an indoor power proportional index for each indoor unit by dividing the indoor consumption factor corresponding to the indoor unit by the sum of the indoor consumption factors for each of the plurality of indoor units, and multiplying the power proportional index for each indoor unit by the indoor electricity consumption measurement.

In some embodiments, the method also includes determining an indoor unit total consumption by adding the indoor share corresponding to the indoor unit and the outdoor share corresponding to the indoor unit. The method also includes generating a total indoor unit charge for each indoor unit by multiplying the indoor unit total consumption corresponding to the indoor unit by an electricity tariff rate. In some embodiments, the method also includes generating an electricity bill for each of a plurality of tenants. Each tenant corresponds to one or more of the plurality of indoor units.

Another implementation of the present disclosure is a system. The system includes an outdoor meter and a management system. The outdoor meter is configured to provide an outdoor electricity consumption measurement of an outdoor unit of a variable refrigerant flow system. The outdoor unit is configured to provide refrigerant to a plurality of indoor units in response to activation requests from the plurality of indoor units. The management system includes a processing system that has a memory and processor. The memory is structured to store instructions that are executable by the processor and cause the processing circuit to receive the outdoor electricity consumption measurement from the outdoor meter, receive activation data relating to the activation requests, and apportion the outdoor electricity consumption measurement among the plurality of indoor units based on the activation data.

In some embodiments, the activation data includes at least one of a compressor request frequency, an average compressor request frequency, a thermo-on time, an indoor unit model number, or an indoor unit capacity. In some embodiments, the processing circuit is caused to apportion the outdoor electricity consumption measurement among the plurality of indoor units based on the activation data by determining an outdoor consumption factor for each the plurality of indoor units based on the activation data, determining a power proportional index for each of the plurality of indoor units based on the outdoor consumption factors, and multiplying each power proportional index by the outdoor electricity consumption measurement.

In some embodiments, the system also includes an indoor meter that provides an indoor electricity consumption measurement of the plurality of indoor units. The indoor units are configured to provide runtime data. The processing circuit is further caused to receive the indoor electricity consumption measurement, receive runtime data relating to the runtimes of the plurality of indoor units, look up a capacity for each of the plurality of indoor units in a database, and apportion the indoor electricity consumption measurement among the plurality of indoor units based on the runtime data and the capacities.

In some embodiments, the plurality of indoor units are operable to regulate the temperature in various building zones corresponding to various tenants. The processing circuit is further caused to generate electricity bills for various tenants based on the apportioned outdoor electricity consumption measurements.

DETAILED DESCRIPTION

Variable Refrigerant Flow Systems

Figure 1A:
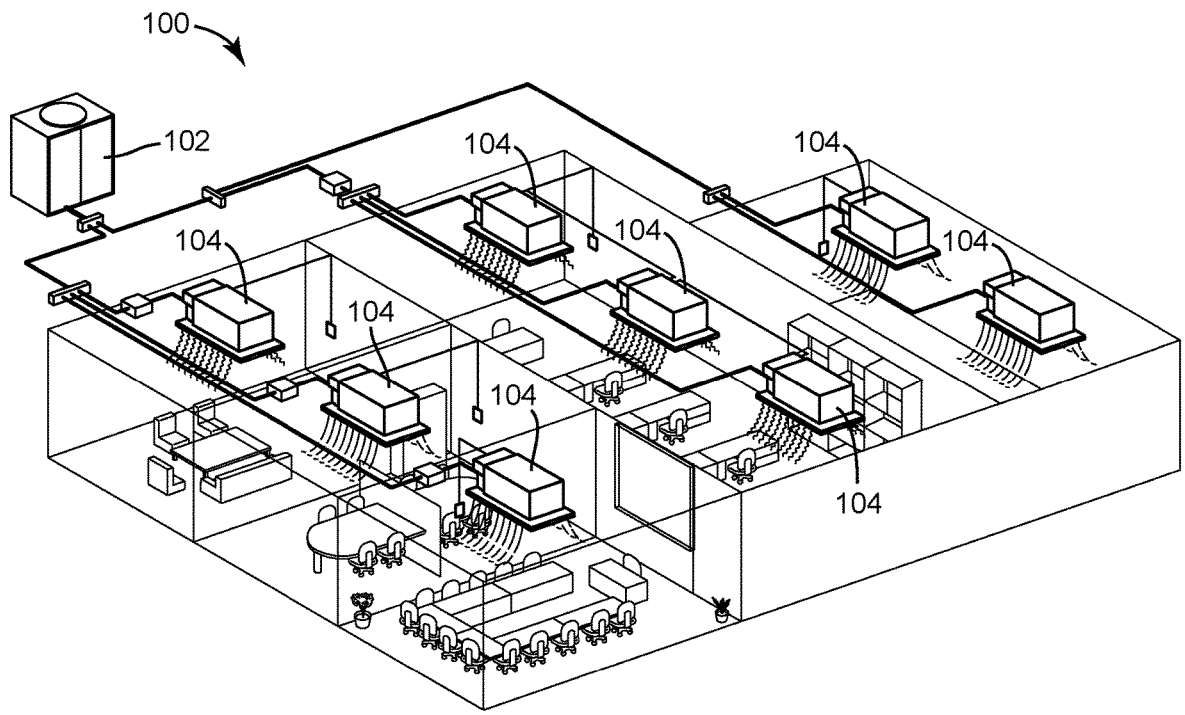
FIG. 1A is a drawing of a variable refrigerant flow (VRF) system including an outdoor VRF unit and a plurality of indoor VRF units, according to an exemplary embodiment.
Figure 1B:
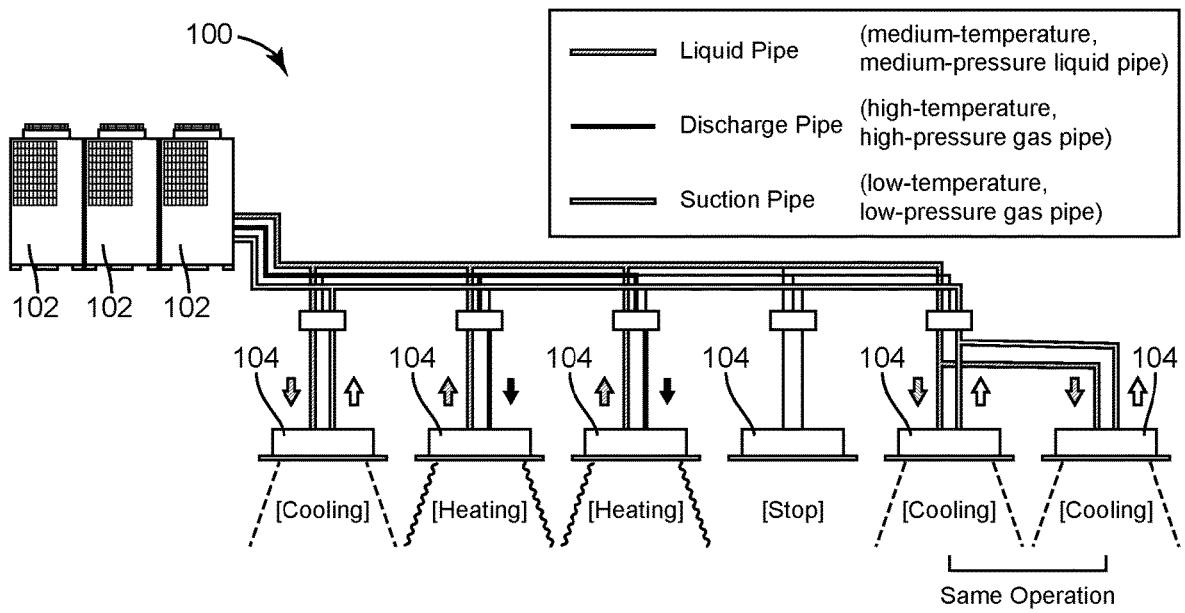
FIG. 1B is another drawing of the VRF system of FIG. 1 illustrating some of the indoor VRF units operating in a cooling mode while other of the indoor VRF units operate in a heating mode, according to an exemplary embodiment.

Referring now to FIGS. 1A-B, a variable refrigerant flow (VRF) system 100 is shown, according to some embodiments. VRF system 100 is shown to include one or more outdoor VRF units 102 and a plurality of indoor VRF units 104. Outdoor VRF units 102 can be located outside a building and can operate to heat or cool a refrigerant. Outdoor VRF units 102 can consume electricity to convert refrigerant between liquid, gas, and/or super-heated gas phases. Indoor VRF units 104 can be distributed throughout various building zones within a building and can receive the heated or cooled refrigerant from outdoor VRF units 102. Each indoor VRF unit 104 can provide temperature control for the particular building zone in which the indoor VRF unit 104 is located. Although the term "indoor" is used to denote that the indoor VRF units 104 are typically located inside of buildings, in some cases one or more indoor VRF units are located "outdoors" (i.e., outside of a building) for example to heat/cool a patio, entryway, walkway, etc.

One advantage of VRF system 100 is that some indoor VRF units 104 can operate in a cooling mode while other indoor VRF units 104 operate in a heating mode. For example, each of outdoor VRF units 102 and indoor VRF units 104 can operate in a heating mode, a cooling mode, or an off mode. Each building zone can be controlled independently and can have different temperature setpoints. In some embodiments, each building has up to three outdoor VRF units 102 located outside the building (e.g., on a rooftop) and up to 128 indoor VRF units 104 distributed throughout the building (e.g., in various building zones). Building zones may include, among other possibilities, apartment units, offices, retail spaces, and common areas. In some cases, various building zones are owned, leased, or otherwise occupied by a variety of tenants, all served by the VRF system 100.

Many different configurations exist for VRF system 100. In some embodiments, VRF system 100 is a two-pipe system in which each outdoor VRF unit 102 connects to a single refrigerant return line and a single refrigerant outlet line. In a two-pipe system, all of outdoor VRF units 102 may operate in the same mode since only one of a heated or chilled refrigerant can be provided via the single refrigerant outlet line. In other embodiments, VRF system 100 is a three-pipe system in which each outdoor VRF unit 102 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system is described in detail with reference to FIG. 2.

Figure 2:
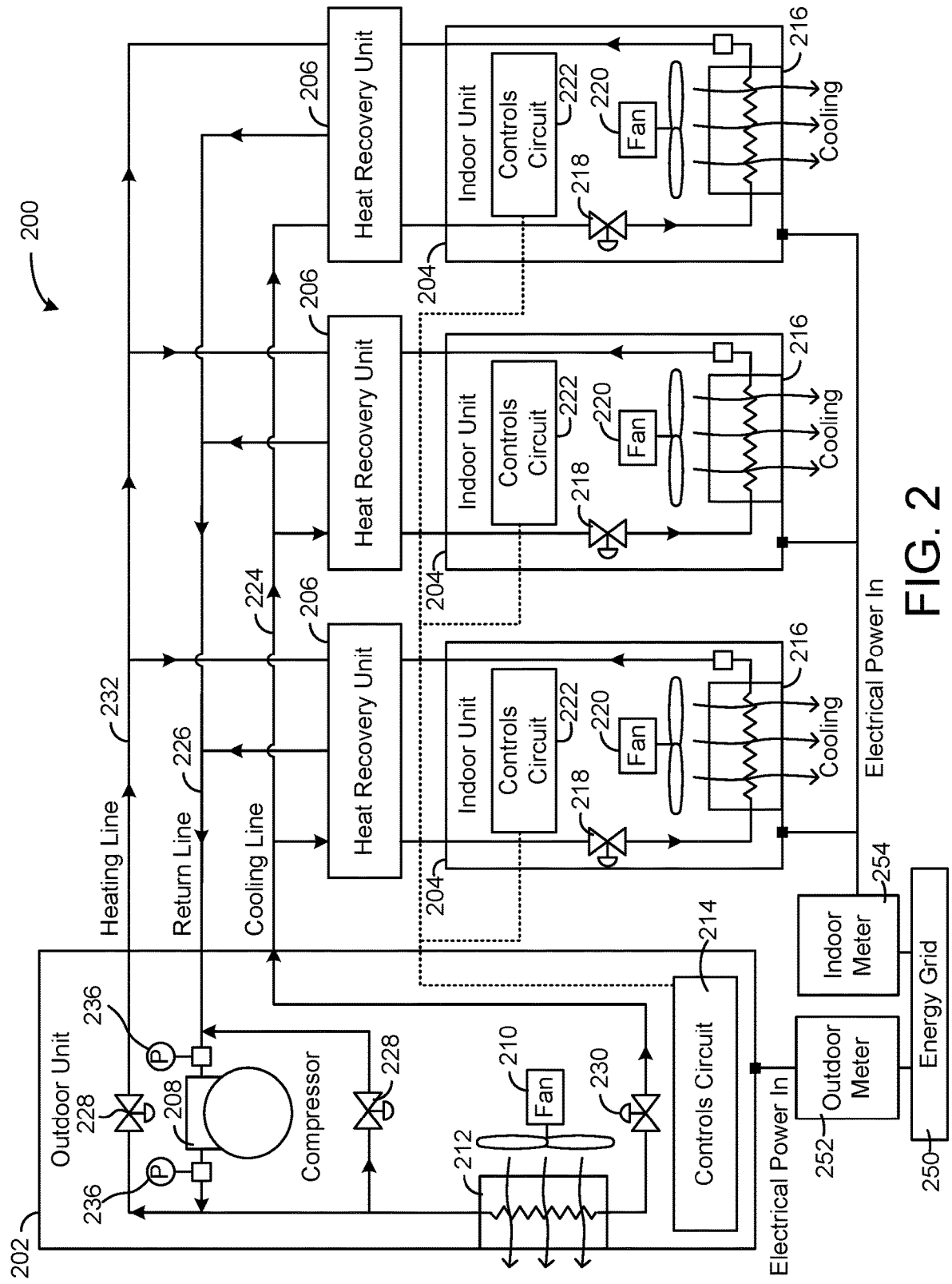
FIG. 2 is a block diagram of a VRF system with electricity meters, according to an exemplary embodiment.

Referring now to FIG. 2, a block diagram illustrating a VRF system 200 is shown, according to some embodiments. VRF system 200 is shown to include outdoor VRF unit 202, several heat recovery units 206, and several indoor VRF units 204. Outdoor VRF unit 202 may include a compressor 208, a fan 210, or other power-consuming refrigeration components configured convert a refrigerant between liquid, gas, and/or super-heated gas phases. Indoor VRF units 204 can be distributed throughout various building zones within a building and can receive the heated or cooled refrigerant from outdoor VRF unit 202. Each indoor VRF unit 204 can provide temperature control for the particular building zone in which the indoor VRF unit 204 is located. Heat recovery units 206 can control the flow of a refrigerant between outdoor VRF unit 202 and indoor VRF units 204 (e.g., by opening or closing valves) and can minimize the heating or cooling load to be served by outdoor VRF unit 202.

Outdoor VRF unit 202 is shown to include a compressor 208 and a heat exchanger 212. Compressor 208 circulates a refrigerant between heat exchanger 212 and indoor VRF units 204. The compressor 208 operates at a variable frequency as controlled by outdoor unit controls circuit 214. At higher frequencies, the compressor 208 provides the indoor VRF units 204 with greater heat transfer capacity. Electrical power consumption of compressor 208 increases proportionally with compressor frequency.

Heat exchanger 212 can function as a condenser (allowing the refrigerant to reject heat to the outside air) when VRF system 200 operates in a cooling mode or as an evaporator (allowing the refrigerant to absorb heat from the outside air) when VRF system 200 operates in a heating mode. Fan 210 provides airflow through heat exchanger 212. The speed of fan 210 can be adjusted (e.g., by outdoor unit controls circuit 214) to modulate the rate of heat transfer into or out of the refrigerant in heat exchanger 212.

Each indoor VRF unit 204 is shown to include a heat exchanger 216 and an expansion valve 218. Each of heat exchangers 216 can function as a condenser (allowing the refrigerant to reject heat to the air within the room or zone) when the indoor VRF unit 204 operates in a heating mode or as an evaporator (allowing the refrigerant to absorb heat from the air within the room or zone) when the indoor VRF unit 204 operates in a cooling mode. Fans 220 provide airflow through heat exchangers 216. The speeds of fans 220 can be adjusted (e.g., by indoor unit controls circuits 222) to modulate the rate of heat transfer into or out of the refrigerant in heat exchangers 216.

In FIG. 2, indoor VRF units 204 are shown operating in the cooling mode. In the cooling mode, the refrigerant is provided to indoor VRF units 204 via cooling line 224. The refrigerant is expanded by expansion valves 218 to a cold, low pressure state and flows through heat exchangers 216 (functioning as evaporators) to absorb heat from the room or zone within the building. The heated refrigerant then flows back to outdoor VRF unit 202 via return line 226 and is compressed by compressor 208 to a hot, high pressure state. The compressed refrigerant flows through heat exchanger 212 (functioning as a condenser) and rejects heat to the outside air. The cooled refrigerant can then be provided back to indoor VRF units 204 via cooling line 224. In the cooling mode, flow control valves 228 can be closed and expansion valve 230 can be completely open.

In the heating mode, the refrigerant is provided to indoor VRF units 204 in a hot state via heating line 232. The hot refrigerant flows through heat exchangers 216 (functioning as condensers) and rejects heat to the air within the room or zone of the building. The refrigerant then flows back to outdoor VRF unit via cooling line 224 (opposite the flow direction shown in FIG. 4). The refrigerant can be expanded by expansion valve 230 to a colder, lower pressure state. The expanded refrigerant flows through heat exchanger 212 (functioning as an evaporator) and absorbs heat from the outside air. The heated refrigerant can be compressed by compressor 208 and provided back to indoor VRF units 204 via heating line 232 in a hot, compressed state. In the heating mode, flow control valves 228 can be completely open to allow the refrigerant from compressor 208 to flow into heating line 232.

As shown in FIG. 2, each indoor VRF unit 204 includes an indoor unit controls circuit 222. Indoor unit controls circuit 222 controls the operation of components of the indoor VRF unit 204, including the fan 220 and the expansion valve 218, in response to a building zone temperature setpoint or other request to provide heating/cooling to the building zone. For example, the indoor unit controls circuit 222 can generate a signal to turn the fan 220 on and off. Indoor unit controls circuit 222 also determines a heat transfer capacity required by the indoor VRF unit 204 and a frequency of compressor 208 that corresponds to that capacity. When the indoor unit controls circuit 222 determines that the indoor VRF unit 204 must provide heating or cooling of a certain capacity, the indoor unit controls circuit 222 then generates and transmits a compressor frequency request to the outdoor unit controls circuit 214 including the compressor frequency corresponding to the required capacity.

Outdoor unit controls circuit 214 receives compressor frequency requests from one or more indoor unit controls circuits 222 and aggregates the requests, for example by summing the compressor frequency requests into a compressor total frequency. In some embodiments, the compressor frequency has an upper limit, such that the compressor total frequency cannot exceed the upper limit. The outdoor unit controls circuit 214 supplies the compressor total frequency to the compressor, for example as an input frequency given to a DC inverter compressor motor of the compressor. The indoor unit controls circuits 222 and the outdoor unit controls circuit 214 thereby combine to modulate the compressor frequency to match heating/cooling demand. The outdoor unit controls circuit 214 may also generate signals to control valve positions of the flow control valves 228 and expansion valve 230, a compressor power setpoint, a refrigerant flow setpoint, a refrigerant pressure setpoint (e.g., a differential pressure setpoint for the pressure measured by pressure sensors 236), on/off commands, staging commands, or other signals that affect the operation of compressor 208, as well as control signals provided to fan 210 including a fan speed setpoint, a fan power setpoint, an airflow setpoint, on/off commands, or other signals that affect the operation of fan 210.

Figure 5:
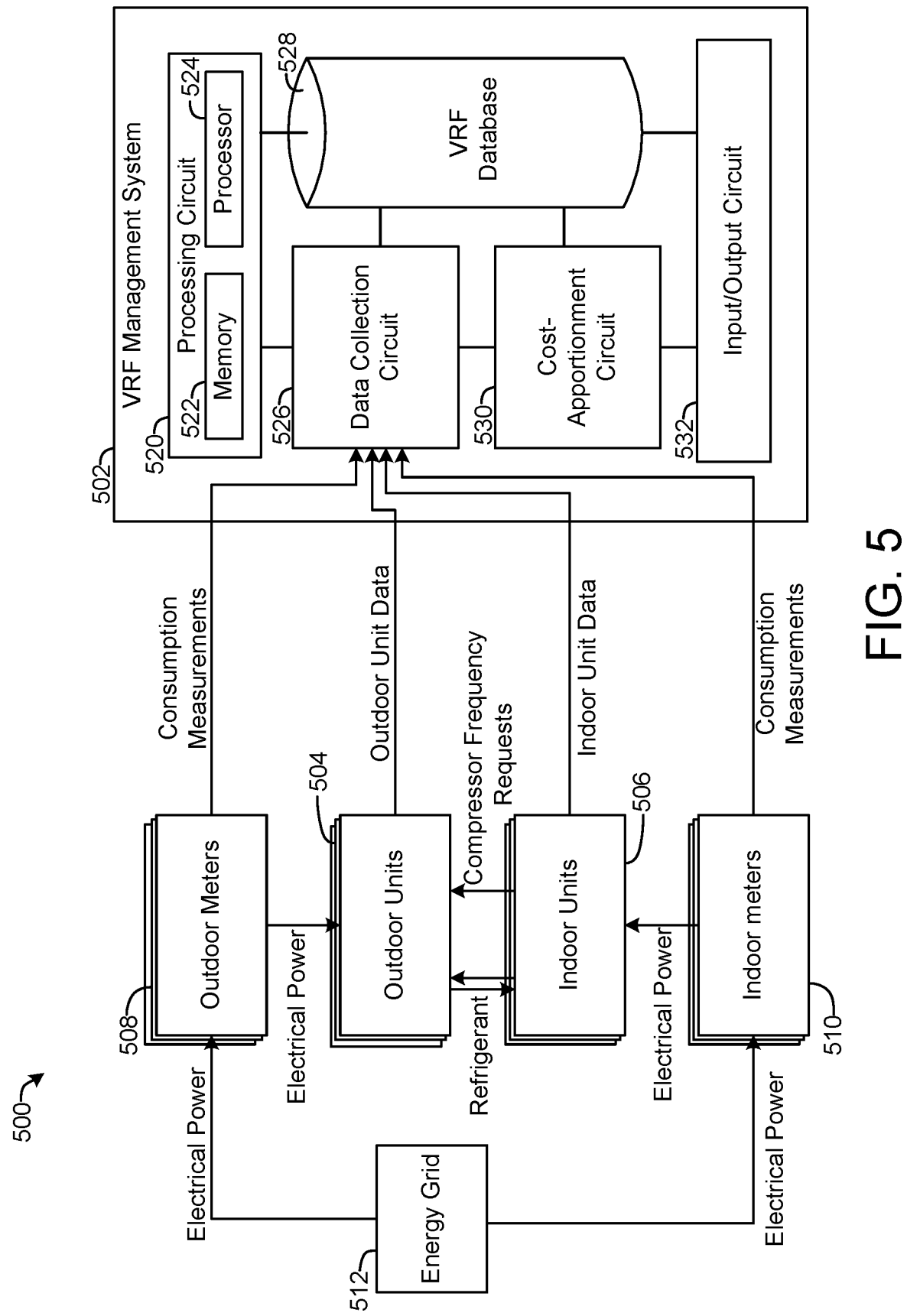
FIG. 5 is a block diagram of a VRF system with electricity cost apportionment, according to an exemplary embodiment.

Indoor unit controls circuits 222 and outdoor unit controls circuit 214 further store and/or provide a data history of one or more control signals generated by or provided to the controls circuits 214, 222. For example, indoor unit controls circuits 222 may store and/or provide a log of generated compressor request frequencies, fan on/off times, and indoor VRF unit 204 on/off times. Outdoor unit controls circuit 214 may store and/or provide a log of compressor request frequencies and/or compressor total frequencies and compressor runtimes. Data points are provided to a VRF management system 502 as shown in FIG. 5 and discussed in detail in reference thereto.

The VRF system 200 is shown as running on electrical power provided by an energy grid 250 via an outdoor meter 252 and an indoor meter 254. According to various embodiments, the energy grid 250 is any supply of electricity, for example an electrical grid maintained by a utility company and supplied with power by one or more power plants. The outdoor meter 252 measures the electrical power consumption over time of the outdoor VRF unit 202, for example in kilowatt-hours (kWh). The indoor meter 254 measures the electrical power consumption over time of the indoor VRF units 204, for example in kWh. As shown in FIGS. 3A-4B and discussed in detail below, a variety of metering configurations are possible for VRF systems. The outdoor meter 252 and the indoor meter 254 are communicable with the VRF management system 502 shown in FIG. 5 to provide power consumption measurements to the VRF management system 502.

Electricity Metering Configurations for VRF Systems

Figure 3A:
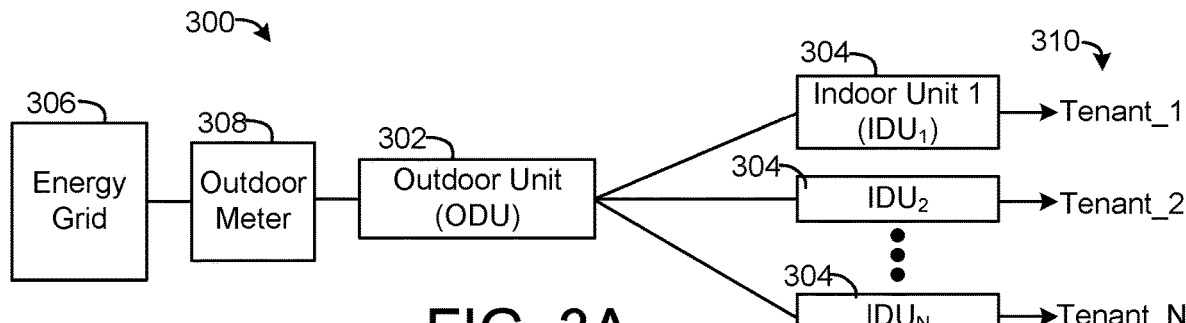
FIG. 3A is a block diagram of a first outdoor unit metering scenario, according to an exemplary embodiment.
Figure 3B:
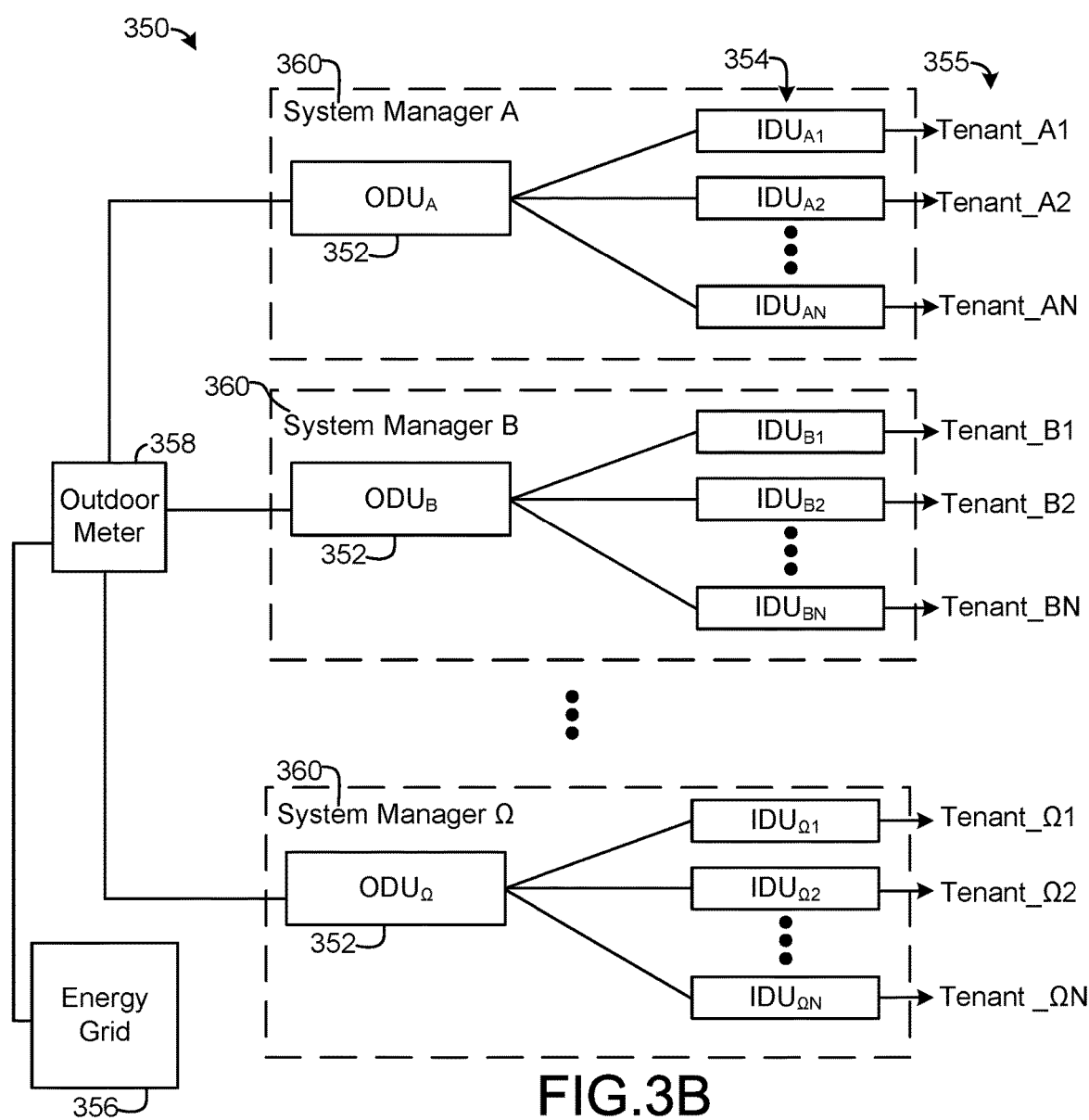
FIG. 3B is a block diagram of a second outdoor unit metering scenario, according to an exemplary embodiment.
Figure 4A:
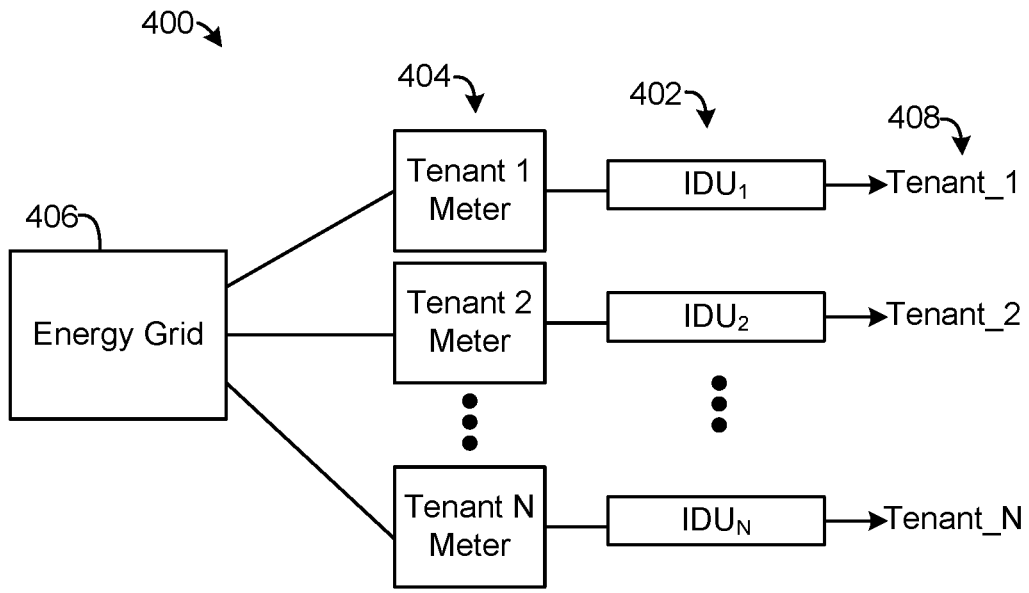
FIG. 4A is a block diagram of a first indoor unit metering scenario, according to an exemplary embodiment.
Figure 4B:
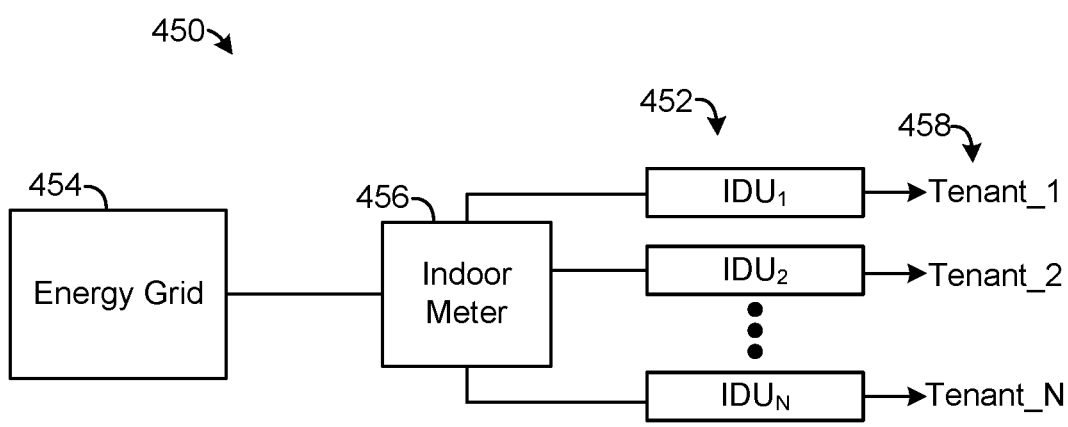
FIG. 4B is a block diagram of a second indoor unit metering scenario, according to an exemplary embodiment.

Referring now to FIGS. 3A-4B, a variety of metering configurations are shown for VRF systems (e.g., VRF system 100, VRF system 200) with one or more outdoor VRF units (ODUs) and multiple indoor VRF units (IDUs). The systems and methods for electricity cost apportionment in VRF systems described herein contemplate each configuration shown in FIGS. 3A-4B, as well as any combination of the four configurations shown. The cost apportionment systems and methods described herein are thus suited for use with a variety of existing or future metering configurations without the need for rewiring of existing meters and systems or installation of new meters. FIGS. 3A-B show metering configurations for ODUs, and FIGS. 4A-B show metering configurations for IDUs.

Referring particularly to FIG. 3A, a first metering configuration 300 is shown, according to an exemplary embodiment. The first metering configuration 300 includes one ODU 302 powered by electricity from energy grid 306 provided via outdoor meter 308. Outdoor meter 308 measures the electrical power consumption of the ODU 302, for example in units of kWh. The ODU 302 serves multiple indoor units 304 (shown as $IDU_1$ through $IDU_N$), located in a variety of building zones and corresponding respectively to multiple tenants 310, namely Tenant_1 through Tenant_N. In some cases, one tenant may correspond to two or more IDUs 304. Each building zone may have a different size, temperature setpoint, or other differing temperature-regulation feature such as insulation, such that the demand placed on the ODU 302 varies between the multiple IDUs 304.

Figure 8:
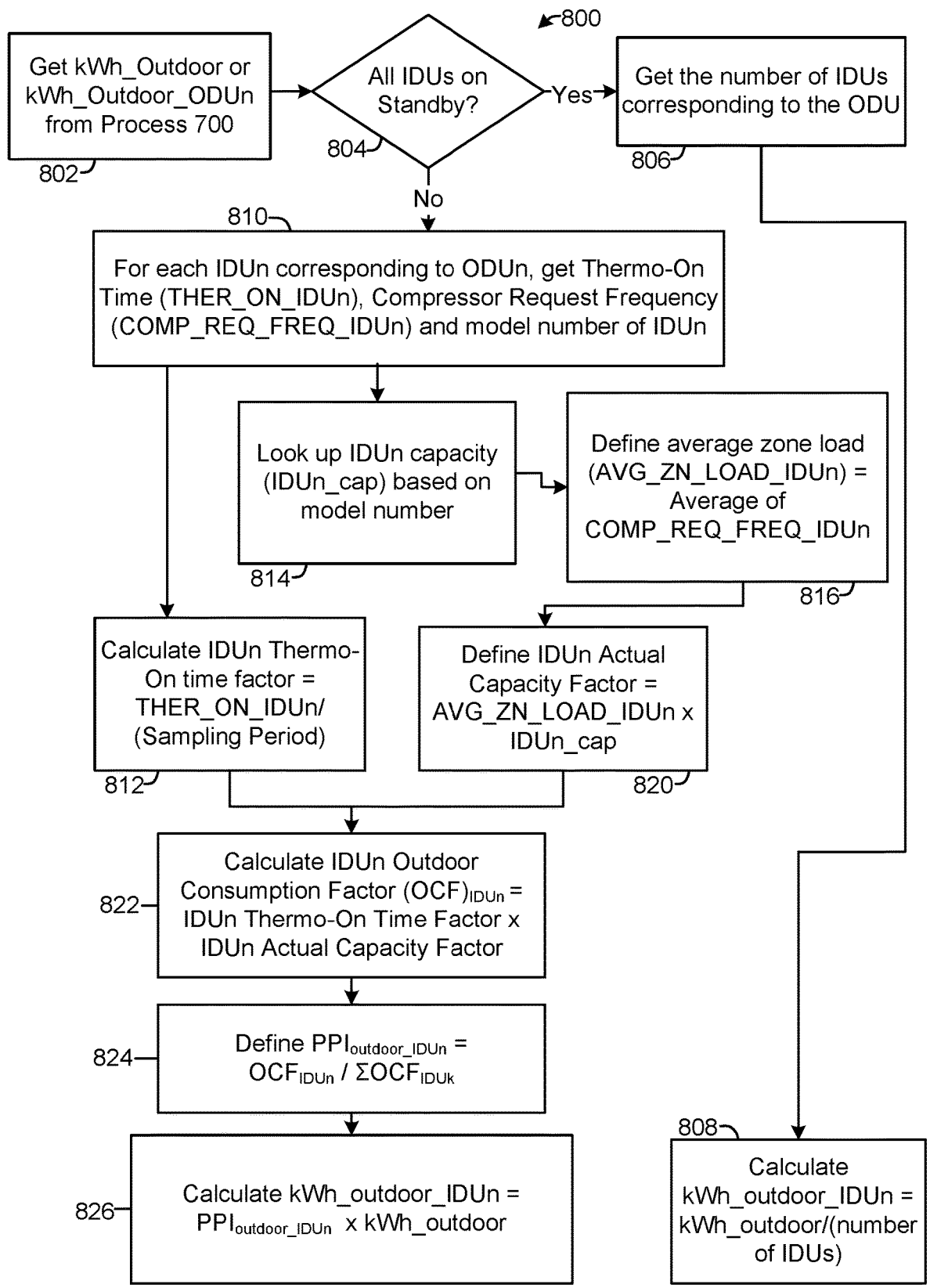
FIG. 8 is a flowchart of a process for apportioning electricity consumption of an outdoor unit among indoor units served by the outdoor unit, according to an exemplary embodiment.

In many cases, each building zone is leased or otherwise corresponds to a particular tenant 310 (e.g., Tenant_2) responsible for the electrical utility costs for that building zone. In the first metering configuration 300, each of the multiple tenants 310 is responsible for the portion of the power consumption of the ODU 302 as measured by the outdoor meter 308 that corresponds to that tenant's IDU 304. Because the electrical power consumption of ODU 302 measured by the outdoor meter 308 corresponds to cooling/heating provided to all IDUs 304, a challenge exists to accurately apportion the measured electrical power consumption among the multiple IDUs 304. FIG. 8, described in detail below, shows a process 800 of accurately apportioning the measured electrical power consumption among the multiple IDUs 304.

Referring now to FIG. 3B, a second metering configuration 350 is shown, according to an exemplary embodiment. The second metering configuration 350 includes multiple ODUs 352 (i.e., $ODU_A$ through $ODU_\Omega$) that draw electrical power from an energy grid 356 via a single outdoor meter 358. The single outdoor meter 358 measures, in one total kWh reading, the electrical power consumption of the multiple ODUs 352.

As in the first metering configuration 300, each ODU 352 serves multiple IDUs 354 located in a variety of building zones that correspond to a variety of tenants 355. For example, $ODU_A$ serves $IDU_{A1}$ through $IDU_{AN}$, which are located in building zones corresponding to Tenant_A1 through Tenant_AN respectively. In the second metering configuration 350, building zones and tenants also correspond to a variety of system managers 360. According to various embodiments, the system managers 360 are landlord, building owners, or property management companies. For example, in a mixed-use facility, System Manager A may be an apartment management company that manages apartments leased by Tenant_A1 through Tenant_AN, System Manager B may be a condominium association that manages condo owners Tenant_B1 through Tenant_BN, and System Manager Ω may be a commercial leasing firm that manages commercial tenants, including Tenant_Ω1 through Tenant_ΩN.

Figure 7A:
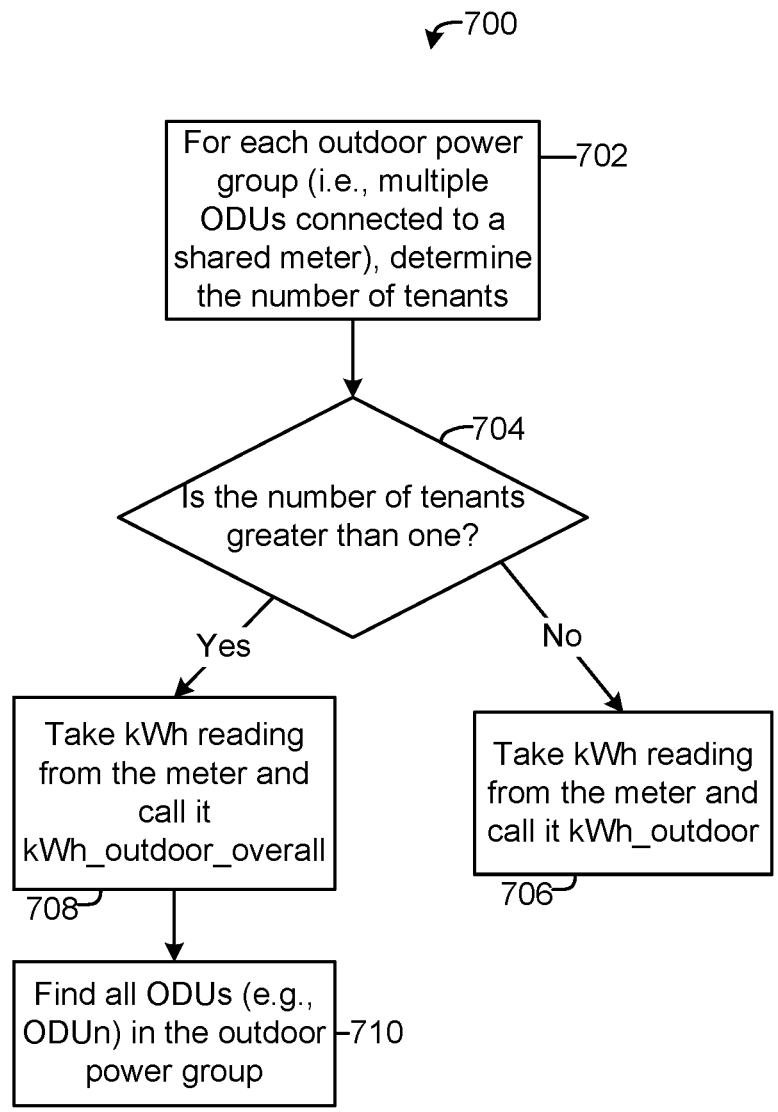
FIG. 7A is a first part of a flowchart of a process for apportioning electricity consumption of outdoor units that share a meter among the outdoor units, according to an exemplary embodiment.
Figure 7B:
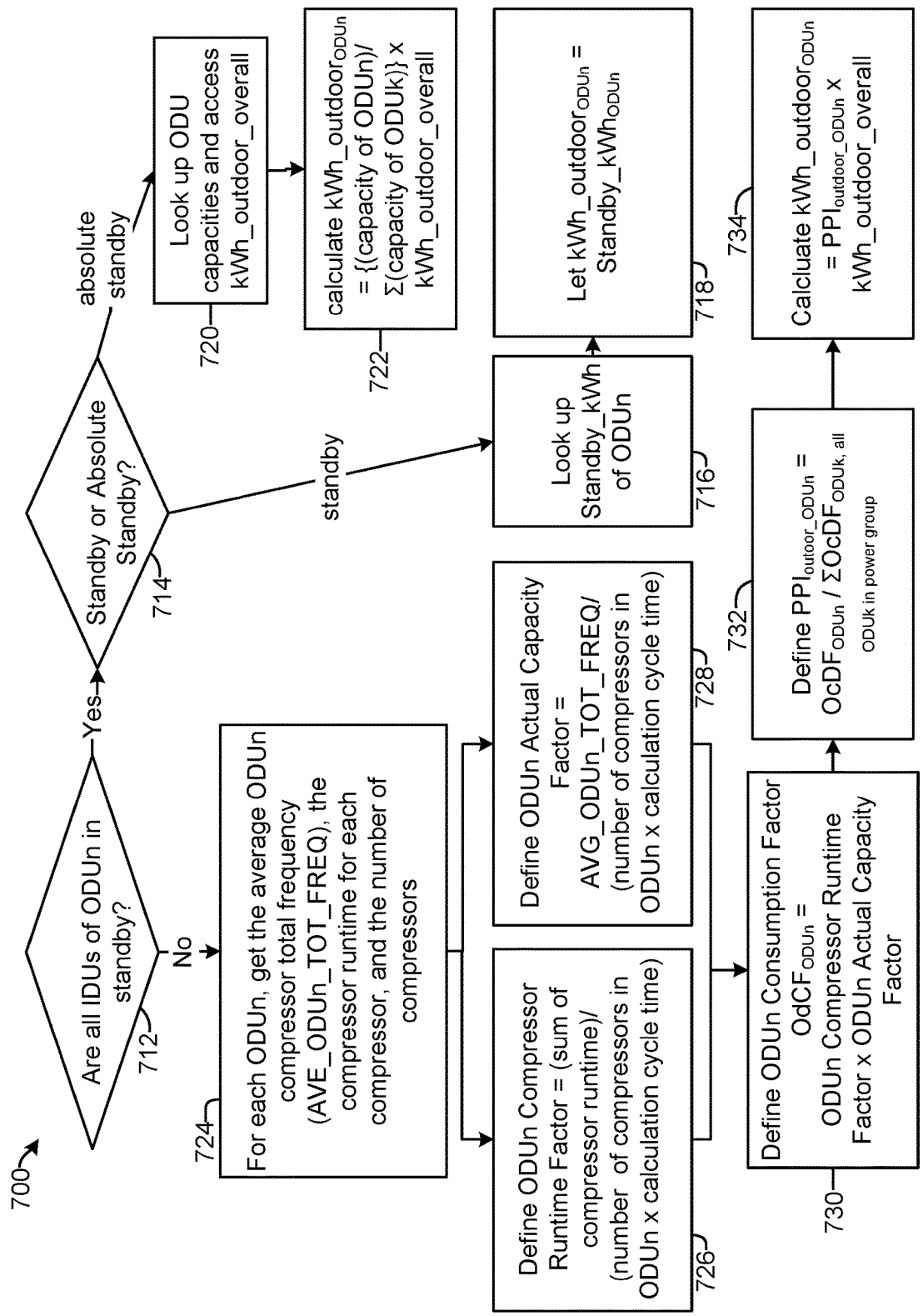
FIG. 7B is a second part of the flowchart of the process of FIG. 7A for apportioning electricity consumption of outdoor units that share a meter among the outdoor units, according to an exemplary embodiment.

Each ODU 352 typically consumes a different amount of electrical power, based on the demand on each ODU 352 from the IDUs 354 that the ODU 352 serves. Thus, in order to apportion electrical utility costs for the facility among the system managers 360, a challenge exists to accurately apportion the total electricity consumption measurement of the outdoor meter 358 among the multiple ODUs 352. A process 700 for apportioning electricity consumption among multiple ODUs is shown in FIGS. 7A-B. Once each ODU 352 (i.e., $ODU_A$ through $ODU_\Omega$) is attributed with a portion of the consumption measured by the outdoor meter 358, for example using process 700, each system manager 360 is left with a set-up that can be handled in a similar manner as the first metering configuration 300 of FIG. 3A, for example according to process 800 of FIG. 8.

Referring now to FIG. 4A, a third metering configuration 400 is shown, according to an exemplary embodiment. The third metering configuration 400 shows multiple IDUs 402 and multiple tenant meters 404. Each IDU 402 corresponds to a tenant 408 and is connected to a corresponding tenant meter 404. Each IDU 402 consumes power from energy grid 406 delivered through the tenant meter 404 corresponding to that IDU 402, such that tenant meter 404 measures the electrical power consumption of a corresponding IDU 402 and does not measure the electrical power consumption of IDUs 402 corresponding to other tenants. In some cases, multiple IDUs 402 correspond to a single tenant 408 and may be metered together in a tenant meter 404. Each tenant meter 404 may also measure non-VRF-related electrical power consumption of the corresponding tenant, for example of lights, appliances, and other electrical devices located in a building zone occupied by the tenant. In such a case, electrical power consumption associated with the operation of an IDU 402 (e.g., power for running the fan 220 and controls circuit 222 of indoor VRF unit 204 shown in FIG. 2) in a tenant's building zone is included with other electricity consumption in that building zone. A utility bill for this consumption can thus be generated without VRF-specific considerations.

Figure 9:
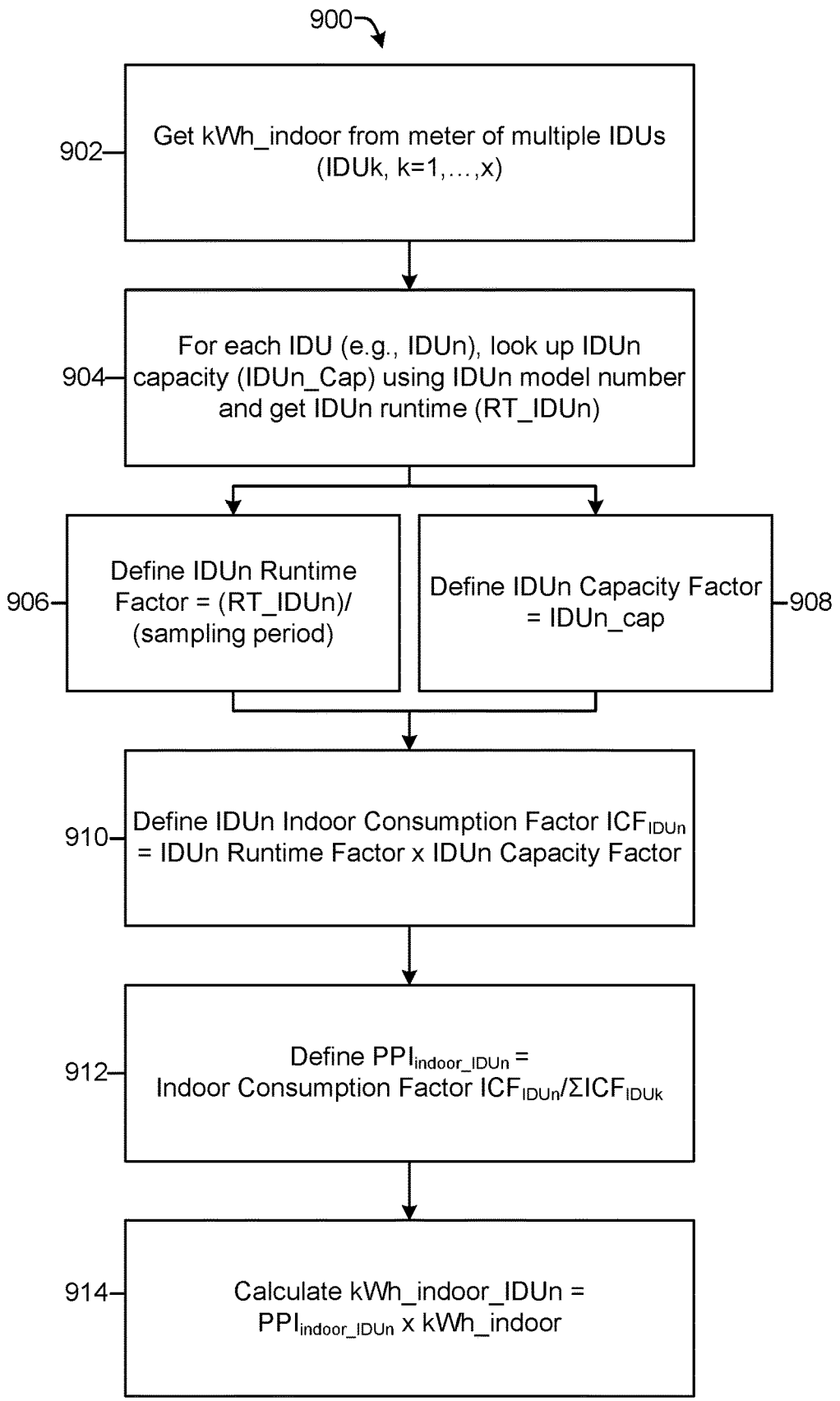
FIG. 9 is a flowchart of a process for apportioning electricity consumption of indoor units that share a meter among the indoor units, according to an exemplary embodiment.

Referring now to FIG. 4B, a fourth metering configuration 450 is shown, according to an exemplary embodiment. Multiple IDUs 452 consume electrical power from energy grid 454 delivered via a single, shared indoor meter 456. The indoor meter 456 measures, in one total kWh reading, the electrical power consumption of the multiple IDUs 354. As shown if FIG. 4B, each IDU 452 corresponds to a different tenant 458 (i.e., Tenant_1 through Tenant_N). In order to accurately generate utility bills for each tenant's electrical power consumption, a challenge exists to accurately apportion the total consumption measured by the indoor meter 456 among the multiple IDUs 452. FIG. 9 shows a process 900 of accurately apportion the total consumption measured by a shared indoor meter among multiple IDUs.

According to various embodiments, the third metering configuration 400 and/or the fourth metering configuration 450 is used with the first metering configuration 300 and/or the second metering configuration 350 to yield a wide variety of possible metering configurations. For example, the VRF system 200 shown in FIG. 2 has a metering configuration according to both the first metering configuration 300 (outdoor VRF unit 202 is metered alone by outdoor meter 252) and the fourth metering configuration 450 (the three indoor VRF units 204 shown in FIG. 2 are metered together by indoor meter 254). In other examples of metered VRF systems, some IDUs are metered together as in the fourth metering configuration 450 and some IDUs are metered separately as in the third metering configuration 400, while some ODUs are metered together as in the second metering configuration 350 and other ODUs are metered alone as in the first metering configuration 300, such that all four metering configurations 300, 350, 400, 450 are represented. The systems and methods shown in FIGS. 5-10 and described in the following address any such variety of metering configuration.

VRF Systems and Methods with Cost Apportionment

Referring now to FIG. 5, a variable refrigerant flow (VRF) system 500 is shown, according to an exemplary embodiment. In general, VRF system 500 transforms electricity into heating and/or cooling of building zones occupied by various tenants and accurately apportions the cost of the electricity among the tenants. VRF system 500 includes VRF management system 502, indoor VRF units (IDUs) 506, outdoor VRF units (ODUs) 504, outdoor meters 508, indoor meters 510, and energy grid 512.

Energy grid 512 supplies electrical power to the VRF system 500. Energy grid 512 is any supply of electrical power, for example a regional electrical grid maintained by a utility company and supplied by one or more power plants that generate electrical power from nuclear, hydro-electric, geothermal, solar, wind, fossil fuel, or other energy sources. In some embodiments, energy grid 512 is a local energy supply, for example a system of building solar panels or another local power system.

ODUs 504 can be located outside a building and can operate to heat or cool a refrigerant, for example by consuming electricity to convert refrigerant between liquid, gas, and/or super-heated gas phases. Each ODU serves a plurality of IDUs 506 by providing the refrigerant to the IDUs 506. Each ODU 504 includes one or more compressors (e.g., compressor 208 shown in FIG. 2) which operate at a compressor frequency that determines the capacity of heat transfer provided to the IDUs by the ODU. Compressor frequency is proportional to electricity consumption. Compressor frequency is based on a compressor total frequency summed from compressor frequency requests received by the ODU 504 from the IDUs 506, and may be controlled by an ODU controls circuit (e.g., outdoor unit controls circuit 214 of FIG. 2). The ODU 504 (e.g., in an ODU control circuit) also collects data relating to the operation of the ODU 504 and shares that data with the VRF management system 502, including, for example, compressor runtimes, received compressor frequency requests with timestamps, compressor total frequency over time, and an average compressor total frequency over a calculation cycle time. In some embodiments, some or all of this data is additionally or alternatively collected and stored by a building management system or building control server located external to ODU 504. According to various embodiments, VRF system 500 includes any number of ODUs 504 of various brands, manufacturers, models, etc.

IDUs 506 can be distributed throughout various building zones within a building and can receive the heated or cooled refrigerant from the ODUs 504. Each IDU 506 can provide temperature control for the particular building zone in which the IDU 506 is located. For example, as shown in FIG. 2, an IDU 506 may include an electrically-powered fan that blows air across a heat exchanger to heat or cool the particular building zone. The refrigerant then cycles back to the corresponding ODU 504 to be re-cooled/reheated.

Each IDU 506, for example using an IDU controls circuit (e.g., indoor unit controls circuit 222), determines a heat transfer capacity required by the IDU 506 and a frequency of compressor 208 that corresponds to that capacity. The heat transfer capacity required by the IDU 506 may be based on a building zone temperature setpoint, a current building zone temperature reading, and/or some other settings or measurements. When the IDU 506 determines that the IDU 506 must provide heating or cooling of a certain capacity, the IDU 506 then generates and transmits a compressor frequency request to the ODU 504 including the compressor frequency corresponding to the required capacity. In some embodiments, the determination of a required capacity and generation of a compressor frequency request are done by a building management server external to the IDU 506.

IDUs 506 are also configured to collect, store, and provide data relating to the operation of the IDUs. IDU data includes, for example, IDU runtimes (e.g., fan runtimes), thermo-on times (i.e., times when heated/cooled refrigerant is requested/received), compressor request frequencies, and/or other data. The IDUs 506 provide this IDU data to the VRF management system 502. According to various embodiments, VRF system 500 includes any number of IDUs 506 of various brands, manufacturers, models, etc.

Outdoor meters 508 measure electrical power consumption of the ODUs 504, for example in units of kWh (kilowatt hours). According to various embodiments, the outdoor meters 508 may be of various brands, types, manufacturers, models of any electricity meter suitable for measuring electrical power consumption. The outdoor meters 508 may be linked to ODUs 504 in various metering configurations as shown in FIGS. 3A-B and described in detail in reference thereto. The outdoor meters 508 provide the electricity consumption measurements of ODUs 504 to the VRF management system 502. Consumption measurements may be transmitted continuously as consumption is measured, or may be provided in set time intervals (e.g., total consumption over one week, one month, etc.). In some embodiments, consumption measurements are transferred from outdoor meters 508 to the VRF management system 502 via a utility company server or some other computing system for managing electricity meters.

Indoor meters 510 measure electrical power consumption of the IDUs 506, for example in units of kWh. According to various embodiments, the indoor meters 510 may be of various brands, types, manufacturers, models of any electricity meter suitable for measuring electrical power consumption. The indoor meters 510 may be linked to IDUs 506 in various metering configurations as shown in FIGS. 4A-B and described in detail in reference thereto. The indoor meters 510 provide the electricity consumption measurements of IDUs 506 to the VRF management system 502. Consumption measurements may be transmitted continuously as consumption is measured, or may be provided in set time intervals (e.g., total consumption over one week, one month, etc.). In some embodiments, consumption measurements are transferred from indoor meters 510 to the VRF management system 502 via a utility company server or some other computing system for managing electricity meters.

VRF management system 502 collects consumption measurements from outdoor meters 508 and indoor meters 510, ODU data from ODUs 504, and IDU data from IDUs 506, and uses that information with stored VRF-system information to apportion electricity costs among tenants. VRF Management System 502 includes a processing circuit 520, a data collection circuit 526, a VRF database 528, a cost-apportionment circuit 530, and an input/output circuit 532.

Processing circuit 520 is configured to carry out one or more functions of the VRF management system 502 described here. Processing circuit 520 includes a memory 522 and a processor 524. The processor 524 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices that comprise memory 522 (e.g., RAM, NVRAM, ROM, Flash Memory, hard disk storage, etc.) may store data and/or computer code for facilitating the various processes described herein. Moreover, the one or more memory devices that comprise memory 522 may be or include tangible, non-transient volatile memory or non-volatile memory. Accordingly, memory 522 may include database components, object code components, script components, or any other type of information structure for supporting the various activities and information structures described herein.

Data collection circuit 526 is configured to receive and categorize data from ODUs 504, IDUs 506, outdoor meters 508, and indoor meters 510. Data received by the data collection circuit 526 includes, but is not necessarily limited to, compressor runtimes, compressor requested frequencies, compressor total frequencies (and/or an average compressor total frequency over a period of time), thermo-on times, IDU runtimes, outdoor meter electricity consumption measurements, and indoor meter electricity consumption measurements. The data collection circuit 526 sorts the received data and stores it in the VRF database 528.

VRF database 528 receives and stores data from the data collection circuit 526 and stores other VRF-related information. The other VRF-related information in the VRF database 528 includes a directory of meters 508-510, IDUs 506, and ODUs 504 that includes relationship information defining the associations between meters 508-510, IDUs 506, and ODUs 504 (i.e., that show which IDUs 506 are served by which ODUs 504, and which meters 508-510 measure consumption of which IDUs and ODUs), as well as links between system managers, tenants, and ODUs 504 and IDUs 506 (e.g., that shows which IDUs 506 operate to heat/cool a building zone leased be a particular tenant). The VRF database 528 thereby stores the information necessary for determining the metering/VRF configuration of the VRF system 500 from among the various possible configurations explained with reference to FIGS. 3A-4B.

For each ODU 504, the VRF database 528 stores a set of ODU characteristics, including, but not limited to, a model number, a number of compressors included in the ODU 504, a standby power consumption quantity, and an ODU capacity (e.g., as provided by the manufacturer and provided in a product bulletin or manual). For each IDU 506, the VRF database 528 stores a set of IDU characteristics, including, but not limited to, a model number and an IDU capacity (e.g., as provided by the manufacturer and provided in a product bulletin or manual). The VRF database 528 may also store electricity rate information, for example a set amount of money per kWh, or some other schedule of electricity rates (e.g., a variable electricity cost rate such that a kWh unit costs more at certain times of day than at other times), and contact information or payment information for tenants to facilitate the provision and/or payment of electricity bills corresponding to electricity consumption of the VRF system 500.

The cost-apportionment circuit 530 is configured to access information stored in the VRF database 528 and use that information to accurately apportion the electricity consumption of the VRF system 500 among multiple tenants and determine an amount of money to charge to each tenant to cover the cost of the power consumption. Accordingly, the cost-apportionment circuit 530 carries out one or more of a series of processes for the accurate apportionment of electricity consumption and assignment of monetary charges shown in FIGS. 6-10 and described in detail with reference thereto. In general, the cost-apportionment circuit 530 apportions electricity consumption using the following approaches:

The cost-apportionment circuit 530 apportions consumption measurements from an outdoor meter 508 shared by multiple ODUs 504 (i.e., for the second metering configuration 350 of FIG. 3B) among the ODUs by accessing an average compressor total frequency for each ODU 504, the compressor runtime for the ODU, and the number of compressors in the ODU 504 in the VRF database 528 to generate a ODU consumption factor for each ODU 504, and apportioning the consumption measurement based on a proportional index defined by a particular ODU's consumption factor over the sum of the ODU consumption factors for all ODU's measured by that meter. In some cases, consumption measurements may be apportioned based on ODU standby consumption or some other standby calculation.

The cost-apportionment circuit 530 apportions consumption measurements attributed to an ODU 504 among the multiple IDUs 506 that it serves (i.e., the first metering configuration 300 of FIG. 3A) by accessing, for each IDU 506, thermo-on time, compressor request frequencies, a model number, and an IDU capacity in the VRF database 528 to generate an IDU outdoor consumption factor for each IDU 506, and apportioning the consumption measurement based on a proportional index defined by a particular IDU's outdoor consumption factor over the sum of outdoor consumption factors for the other IDUs 506 served by the ODU 504.

The cost-apportionment circuit 530 apportions a consumption measurement of an indoor meter 510 shared by multiple IDUs 506 (i.e., the fourth metering configuration 450 of FIG. 4B) by accessing, for each IDU 506, an IDU capacity and an IDU runtime in the VRF database 528 to generate an indoor consumption factor for each IDU 506, and apportioning the consumption measure among the multiple IDUs 506 based on a proportional index defined by a particular IDU's indoor consumption factor over the sum of indoor consumption factors for the other IDUs 506 that share the indoor meter 510.

The cost-apportionment circuit 530 assigns monetary charges to tenants by determining which IDUs correspond to which tenants based on information stored in the VRF database 528, accessing a tariff rate in the VRF database 528, and calculating a charge by multiplying the tariff rate by the total electricity consumption apportioned to IDUs corresponding to each tenant.

The input/output circuit 532 is configured to generate notifications, bills, user interfaces, and/or other communications to a user of the VRF system 500 and to accept user input to the VRF management system 502 regarding set-up, settings, options, or other information a user desires to provide to the VRF management system 502. For example, in some embodiments the input/output circuit 532 generates an email containing an indication of the monetary charges owed by a tenant to cover the tenant's share of the electricity consumption of VRF system 500 and transmits the email to the tenant's email inbox, mobile device, or other electronic device. In some embodiments, the input/output circuit 532 generates a user interface that a system manager can access using a computing device (e.g., a laptop, tablet, mobile device, desktop computer) to view VRF electricity apportionments and edit tenant information or other settings. The input/output circuit 532 thereby facilitates the communication of the electricity consumption apportionment of the cost-apportionment circuit 530 to one or more users.

Figure 6:
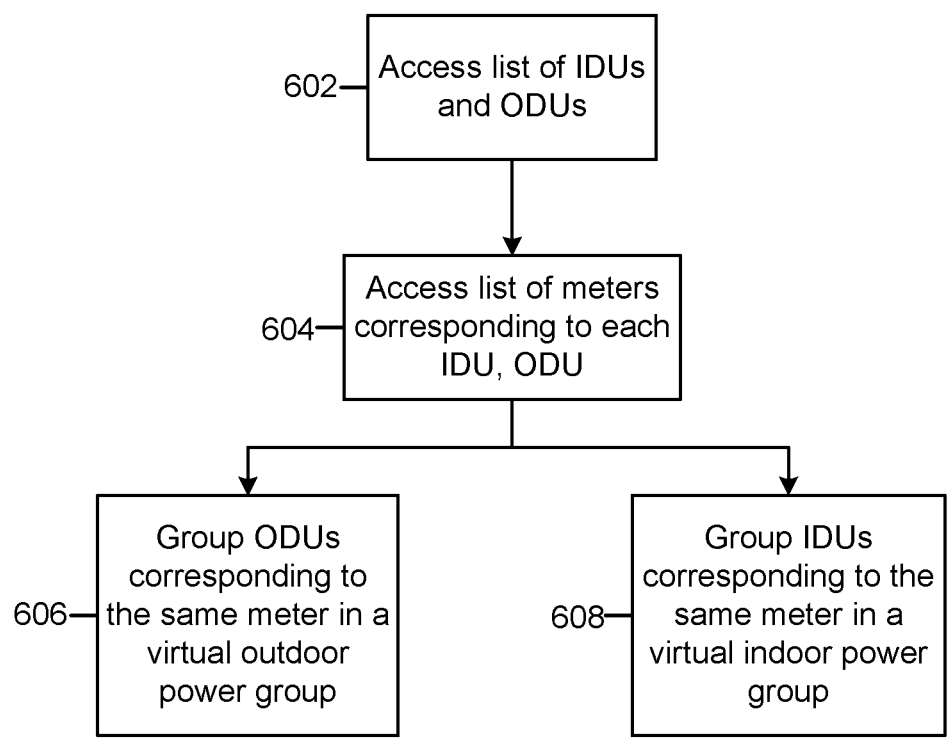
FIG. 6 is a flowchart of a process for grouping indoor units and outdoor units, according to an exemplary embodiment.

Referring now to FIG. 6, a process 600 for grouping outdoor units and indoor units for use in apportioning electricity charges is shown, according to an exemplary embodiment. Process 600 may be carried out by cost-apportionment circuit 530 in communication with VRF database 528. At step 602, the cost-apportionment circuit 530 accesses a list of all IDUs and ODUs of VRF system 500 in the VRF database 528. At step 604, the cost-apportionment circuit 530 accesses a list of outdoor meters 508 corresponding to ODUs 504 and list of indoor meters 510 corresponding to IDUs 506 in the VRF database 528. According to various embodiments, these lists are automatically generated by the VRF management system 502, input by a user via input/output circuit 532, or some combination of the two. At step 606, the ODUs corresponding to the same meter are grouped in a virtual outdoor power group. The virtual outdoor power group determinations may be stored in the VRF database 528. At step 608, the IDUs corresponding to the same meter are grouped in a virtual indoor power group. The virtual indoor power group determinations may be stored in the VRF database 528. Virtual outdoor power groups and virtual indoor power groups may be useful for apportioning electricity costs among ODUs and IDUs in the virtual power groups.

Referring now to FIGS. 7A-B, a process 700 for apportioning an electricity consumption measurement among multiple ODUs 504 metered by a single outdoor meter 508 is shown, according to an exemplary embodiment. FIG. 7A shows a first part of the process 700, with FIG. 7B showing a second part of the process 700. Process 700 may be carried out by the VRF management system 502 of FIG. 5, and more particularly by the cost-apportionment circuit 530 in communication with the VRF database 528. Process 700 addresses the challenge posed by the second metering configuration 350 of FIG. 3B, namely the need to accurately split electricity consumption among multiple ODUs when the electricity consumption for the multiple ODUs is measured by a shared meter.

At step 702, the number of tenants for each outdoor power group is determined. As described with reference to FIG. 6, an outdoor power group includes all ODUs connected to one outdoor meter. To carry out step 702, the cost-apportionment circuit 530 may access the VRF database 528 to access a directory of tenant to ODU relationships and count the number of tenants associated with ODUs in the outdoor power group.

At step 704, the cost-apportionment circuit 530 asks if the number of tenants in the outdoor power group is greater than one. If not, the process 700 proceeds to step 706, where the electricity consumption reading is taken from the outdoor meter and assigned the label "kWh_Outdoor." Because only one tenant is served by the outdoor power group, the total kWh_Outdoor can be attributed to that tenant for purposes of electricity cost apportionment, and the process 700 can end at step 706.

If the number of tenants served by the outdoor power group is greater than one, at step 708 the cost-apportionment circuit 530 access the electricity consumption measurement from the outdoor meter and labels it "kWh_Outdoor_Overall." The measurement kWh_Outdoor_Overall includes electricity consumption corresponding to multiple tenants that can be apportioned among the multiple ODUs according to the remaining steps of process 700.

At step 710, the cost-apportionment circuit 530 identifies all ODUs in the outdoor power group, among which kWh_Outdoor_Overall is to be apportioned. The process 700 continues from step 710 in FIG. 7A to step 712 in FIG. 7B. The following steps (i.e., steps shown in FIG. 7B) occur for each ODU in the outdoor power group, with any one ODU of the outdoor power group referred to using the notation $ODU_n$ in the following discussion.

At step 712, the VRF management system 502 determines whether all IDUs served by $ODU_n$ are in standby. Standby may refer to a status in which none of the IDUs served by $ODU_n$ operate to heat/cool corresponding building zones during the sample time period. If all IDUs serve by $ODU_n$ are in standby, at step 714 the VRF management system 502 determines whether the IDUs are in standby or in absolute standby. If the IDUs are in standby, at step 716 the cost-apportionment circuit 530 accesses the VRF database 528 to look up a standby consumption for $ODU_n$ ("Standby_$kWh_{ODUn}$"), which may be stored in the VRF database 528 based on a standby consumption rate quoted in a product manual or information sheet. At step 718, the cost-apportionment circuit 530 defines the outdoor power consumption attributable to $ODU_n$ ("kWh_outdoor$_{ODUn}$") to be equal to Standby_$kWh_{ODUn}$.

If the IDUs are in absolute standby, at step 720 the total consumption measurement measured by the outdoor meter ("kWh_outdoor_overall") and ODU capacity for each ODU in the outdoor power group are accessed by the cost-apportionment circuit 530. ODU capacity may be stored and accessed in the VRF database 528 based on capacity information found in a product manual or information sheet. The kWh_outdoor_overall measurement may be provided to the cost-apportionment circuit by the data collection circuit 526 or may be stored and accessed in the VRF database 528.

At step 722, the cost-apportionment circuit 530 calculates kWh_outdoor$_{ODUn}$ as equal to kWh_outdoor_overall multiplied by the capacity of $ODU_n$ and divided by the sum of the capacities of all ODUs in the outdoor power group. That is, kWh_outdoor$_{ODUn}$=kWh_outdoor_overall*(capacity of $ODU_n$)/($\Sigma$ capacity of $ODU_{k, for\ all\ k\ in\ power\ group}$). In other words, kWh_outdoor_overall is apportioned proportionally based on manufacturer-defined capacities of the ODUs.

If not all of the IDUs are on standby (i.e., one or more IDUs serving $ODU_n$ are not on standby), the process 700 proceeds from step 712 to step 724 where, for each $ODU_n$, the cost-apportionment circuit 530 acquires an average $ODU_n$ compressor total frequency ("AVG_$ODU_n$_TOT_FREQ") over a sample time period, the compressor runtime for each compressor in $ODU_n$, and the number of compressors in $ODU_n$. For example, the cost-apportionment circuit 530 may access this data in the VRF database 528. In some embodiments, the cost-apportionment circuit 530 acquires the average $ODU_n$ compressor total frequency by getting a series of $ODU_n$ compressor total frequencies for the sample time period and running an averaging calculation to determine the average $ODU_n$ compressor total frequency over the time period.

At step 726, an $ODU_n$ compressor runtime factor is defined as the sum of compressor runtimes divided by the multiple of the calculation cycle time and the number of compressors in $ODU_n$. That is, the $ODU_n$ compressor runtime factor=(Sum of Compressor Runtimes)/(number of compressors in $ODU_n$*calculation cycle time). In some embodiments, for example, the calculation cycle time is thirty minutes. At step 728, an $ODU_n$ actual capacity factor is defined as the average $ODU_n$ compressor total frequency divided by the multiple of the calculation cycle time and the number of compressors in $ODU_n$. That is, $ODU_n$ actual capacity factor=AVG_$ODU_n$_TOT_FREQ/(number of compressors in ODUn×calculation cycle time). At step 730, an $ODU_n$ consumption factor ("OdCF$_{ODUn}$") is defined as the $ODU_n$ compressor runtime factor multiplied by the $ODU_n$ actual capacity factor. That is, OdCF$_{ODUn}$=($ODU_n$ Compressor Runtime Factor)*($ODU_n$ Actual Capacity Factor).

At step 732, an outdoor $ODU_n$ power proportional index ("PPI$_{outdoor\_ODUn}$") is defined as the $ODU_n$ consumption factor divided by the sum of ODU consumption factors for all ODUs in the outdoor power group. That is, PPI$_{outdoor\_ODUn}$=OdCF$_{ODUn}$/$\Sigma$OdCF$_{ODUk\ for\ all\ ODUk\ in\ the\ power\ group}$.

At step 734, PPI$_{outdoor\_ODUn}$ is used to apportion kWh_outdoor_overall among the ODUs in the outdoor power group to get a consumption measurement for each $ODU_n$ ("kWh_outdoor$_{ODUn}$"). The cost-apportionment circuit 530 calculates kWh_outdoor$_{ODUn}$=PPI$_{outdoor\_ODUn}$*kWh_outdoor_overall. Process 700 thereby results in an accurately apportioned electricity consumption quantity for each ODU 504 in VRF system 500.

Referring now to FIG. 8, a flowchart of a process 800 for apportioning the electricity consumption of an ODU among the IDUs that the ODU serves is shown, according to an exemplary embodiment. Process 800 may be carried out by the cost-apportionment circuit 530 in communication with the VRF database 528 of the VRF management system 502 of FIG. 5. Process 800 is directed towards the challenge of apportioning the consumption of one ODU among the multiple IDUS that it serves, as shown in the first metering configuration 300 of FIG. 3A.

At step 802, the cost-apportionment circuit 530 starts process 800 by getting the electricity consumption for the ODU of interest, for example by taking kWh_Outdoor from step 706 of process 700, or kWh_Outdoor_$ODU_n$ from step 718, step 722, or step 734 of process 700.

At step 804, the cost-apportionment circuit 530 identifies all IDUs served by the ODU, and asks whether all IDUs are on standby. If all IDUs are on standby, at step 806 the cost-apportionment circuit 530 counts the IDUs to determine the number of IDUs served by the ODU. In some embodiments, the cost-apportionment circuit 530 looks up the number of IDUs served by the ODU in the VRF database 528. At step 808, the ODU's electricity consumption attributable to each IDU ("kWh_outdoor_$IDU_n$") is calculated as kWh_outdoor_$ODU_n$ divided by the number of IDUs served by $ODU_n$. That is, kWh_outdoor_$IDU_n$=kWh_outdoor_$ODU_n$/(number of IDUs).

If the IDUs are not all on standby as determined in step 804, the process 800 proceeds to step 810. At step 810, for each $IDU_n$ served by $ODU_n$, the cost-apportionment circuit 530 acquires a thermo-on time ("THER_ON_$IDU_n$") for a sample time period, compressor request frequencies ("COMP_REQ_FREQ_$IDU_n$") over the sample time period, and the model number of $IDU_n$. For example, the cost-apportionment circuit 530 may look up this data in the VRF database 528. At step 812, an $IDU_n$ thermo-on time factor is calculated as equal to THER_ON_IDU$_n$ divided by the duration of the sample time period.

At step 814, the cost-apportionment circuit 530 looks up the IDU$_n$ capacity ("IDU$_n$_cap") based on the model number in the VRF database 528. IDU$_n$_cap is a value stored in the VRF database 528 and included by the manufacturer of IDU$_n$ in a product information sheet for the model of IDU$_n$. At step 816, an average zone load ("AVG_ZN_LOAD_IDU$_n$") is defined as the average of COMP_REQ_FREQ_IDU$_n$ over the sample time period. At step 820, an IDU$_n$ actual capacity factor is defined as AVG_ZN_LOAD_IDU$_n$ multiplied by IDU$_n$_cap.

At step 822, an IDU$_n$ outdoor consumption factor ("OCF$_{IDUn}$") is defined as the IDU$_n$ thermo-on time factor multiplied by the IDU$_n$ actual capacity factor. At step 824, an IDU$_n$ outdoor power proportional index ("PPI$_{outdoor\_IDUn}$") is defined as OCF$_{IDUn}$ divided by the sum of outdoor consumption factors for all IDUs in the indoor power group (i.e., all IDUs served by the ODU). That is, PPI$_{outdoor\_IDUn}$=OCF$_{IDUn}$/ΣOCF$_{IDU, k\ for\ all\ IDUs\ served\ by\ one\ ODU}$.

At step 826, the electricity consumption attributable to IDU$_n$ ("kWh_outdoor_IDU$_n$") is calculated as PPI$_{outdoor\_IDUn}$ multiplied by the total electricity consumption attributed to the ODU, i.e., kWh_outdoor_ODU$_n$. That is, kWH_outdoor_IDU$_n$=PPI$_{outdoor\_IDUn}$*kWh_outdoor_ODU$_n$. Process 800 thereby apportions electricity consumption of one ODU (e.g., ODU$_n$) among the IDUs that the ODU serves.

Referring now to FIG. 9, a process 900 for apportioning electricity consumption among multiple IDUs with indoor electricity consumption meter by a shared indoor meter. Process 900 thereby addresses the fourth metering configuration 450 of FIG. 4B. Process 900 may be carried out by the cost-apportionment circuit 530 in communication with VRF database 538 in the VRF management system 502.

At step 902, the cost-apportionment circuit 530 acquires an electricity consumption measurement ("kWh_indoor") from an indoor meter 510 that measures the indoor consumption of multiple IDUs 506 (e.g., indoor meter 456 of FIG. 4B). As described in reference to FIG. 6, all IDUs corresponding to that meter may be grouped in an indoor power group. According to various embodiments, the cost-apportionment circuit 530 looks up kWh_indoor in the VRF database 528 and/or receives kWh_indoor from the data collection circuit 526.

At step 904, for each IDU (e.g., IDU$_n$) in the indoor power group, the cost-apportionment circuit 530 looks up the IDU$_n$ capacity ("IDU$_n$ cap") based on IDU$_n$'s model number in the VRF database 528 and acquires an IDU$_n$_runtime ("RT_IDU$_n$"). In some cases, RT_IDU$_n$ corresponds to a duration of time that a fan in IDUn was powered-on and rotating during a calculation cycle time. RT_IDU$_n$ may be collected by the data collection circuit 526 and stored in the VRF database 528.

At step 906, an IDU$_n$ runtime factor is defined as RT_IDU$_n$ divided by the duration of the calculation cycle time. That is, the IDU$_n$ runtime factor is the proportion of the total calculation cycle time for which the IDU was running. At step 908, an IDU$_n$ capacity factor is defined as equal to IDU$_n$ cap. At step 910, an IDU$_n$ indoor consumption factor ("ICF$_{IDUn}$") is defined as the IDU$_n$ runtime factor multiplied by the IDU$_n$ capacity factor.

At step 912, an IDU$_n$ indoor power proportional index ("PPI$_{indoor\_IDUn}$") is defined as equal to ICF$_{IDUn}$ divided by the sum of indoor consumption factors for all IDUs in the indoor power group. That is, PPI$_{indoor\_IDUn}$=ICF$_{IDUn}$/ΣICF$_{IDUk, k\ for\ all\ IDUs\ measured\ by\ the\ same\ indoor\ meter}$.

At step 914, the cost-apportionment circuit 530 determines an indoor power consumption attributable to each IDU ("kWh_indoor_IDU$_n$") based on the indoor power proportional indexes and kWh_indoor. More particularly, the cost-apportionment circuit 530 calculates kWh_indoor_IDU$_n$=PPI$_{indoor\_IDUn}$*kWh_indoor. Process 900 thereby results in an indoor power consumption attributable to each IDU in an indoor power group.

Figure 10:
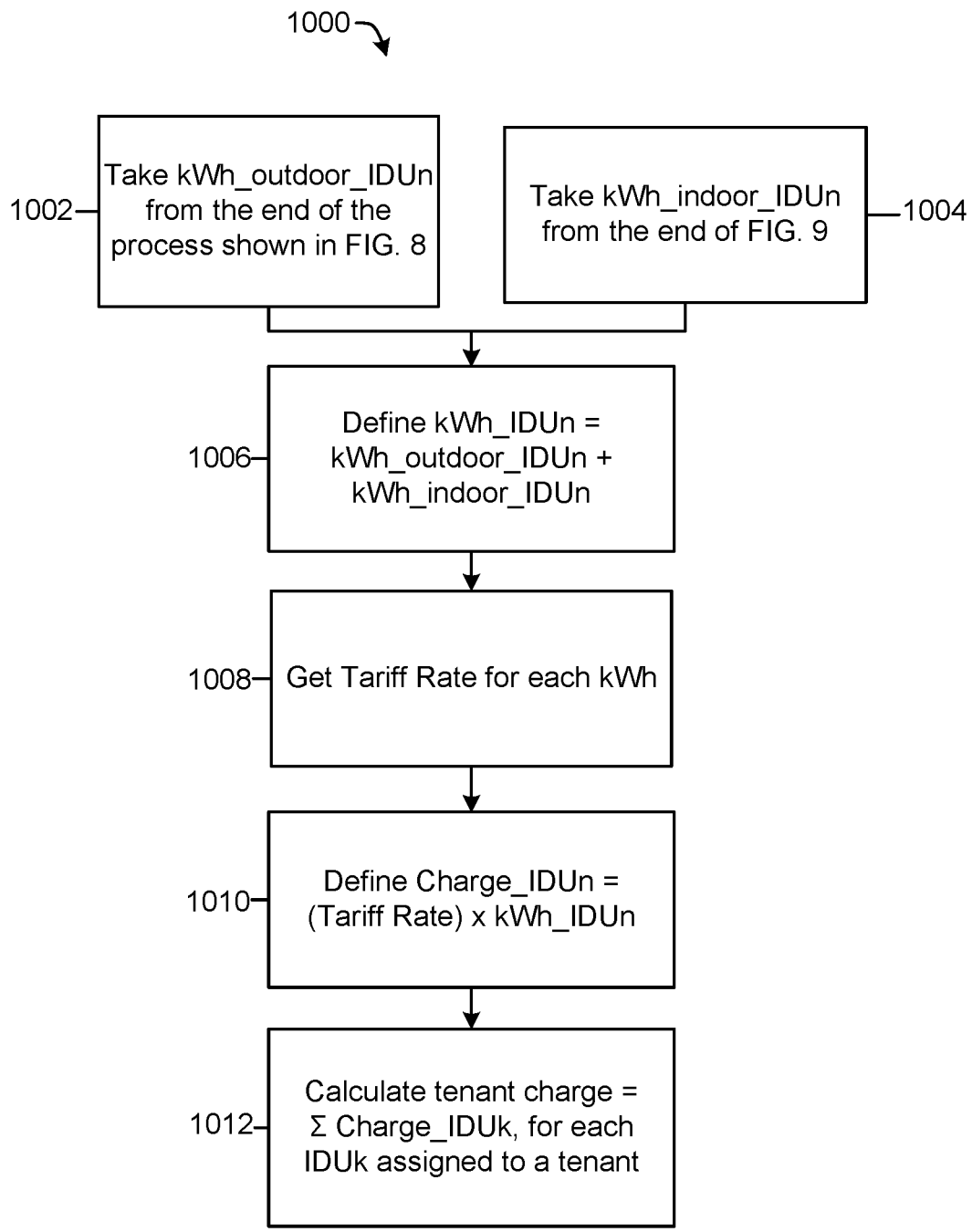
FIG. 10 is a flowchart of a process for calculating a tenant charge based on the apportionments of FIGS. 7-9, according to an exemplary embodiment.

Referring now to FIG. 10, a process 1000 for determining an electricity charges for various tenants is shown, according to an exemplary embodiment. Process 1000 may be carried out by the VRF management system 502 to address any combination of metering configurations as described with reference to FIGS. 3A-4B. Process 1000 may be carried out once per billing cycle (e.g., monthly), on demand from a user, or with some other frequency.

At step 1002, the cost-apportionment circuit 530 takes kWh_outdoor_IDU$_n$ for all n from the end of process 800 (i.e., from step 808 and/or step 826). At step 1004, the cost-apportionment circuit 530 takes kWh_indoor_IDU$_n$ for all n from the end of process 900 (i.e., from step 914).

At step 1006, a total IDU$_n$ electricity consumption ("kWh_IDU$_n$") is defined as kWh_IDU$_n$=kWh_outdoor_IDU$_n$+kWh_indoor_IDU$_n$. That is, the outdoor consumption attributable to each IDU is summed with the indoor consumption attributable to that IDU to get a total electricity consumption for that IDU.

At step 1008, the cost-apportionment circuit 530 gets a tariff rate for each unit of electricity (e.g., dollars per kWh). The tariff rate can be in any currency (e.g., dollars, Euros, rupees) rated per unit of electricity consumption. The tariff rate may be stored in the VRF database 528, for example as supplied by an electrical utility company. At step 1010 a charge per IDU$_n$ for a sample time period ("Charge_IDU$_n$") is defined as the tariff rate multiplied by kWh_IDU$_n$.

At step 1012, the cost-apportionment circuit 530 calculates a charge for each tenant as the sum of Charge_IDU$_k$ for all IDUs assigned to a tenant. The cost-apportionment may access a list of tenants and IDUs in the VRF database 528 to determine which IDUs correspond to which tenants. Process 1000 thereby results in an amount of currency that can be billed to tenants that accurately reflects the tenants' contribution to the power consumption of the VRF system 500. In some embodiments, the input/output circuit 532 generates bills, transmits bills to tenants, receives payment information from tenants, and otherwise facilitates tenant's fulfillment of the calculated charges.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

What is claimed is:

1. A variable refrigerant flow system for a building, the variable refrigerant flow system comprising:
    a plurality of indoor units for the building configured to generate activation requests;
    a first outdoor unit configured to receive the activation requests and, in response to the activation requests, provide a refrigerant to the plurality of indoor units;
    an outdoor meter configured to provide an outdoor unit electricity consumption measurement; and
    a variable refrigerant flow management system configured to:
        receive the outdoor unit electricity consumption measurement and activation data indicating the activation requests; and
        apportion an outdoor share of the outdoor electricity consumption measurement to each of the plurality of indoor units based on the activation data
    wherein the first outdoor unit comprises a compressor and the activation data comprises a compressor request frequency for each of the plurality of indoor units; and
    wherein the variable refrigerant flow management system is configured to apportion each outdoor share of the outdoor electricity consumption by calculating an outdoor consumption factor for each indoor unit based on the compressor request frequency corresponding to the indoor unit.

2. The variable refrigerant flow system of claim 1, wherein the variable refrigerant flow management system is further configured to apportion each outdoor share of the outdoor electricity consumption by:
    calculating a power proportional index for each indoor unit by dividing the outdoor consumption factor corresponding to the indoor unit by a sum of the outdoor consumption factors for each of the plurality of indoor units; and multiplying the power proportional index for each indoor unit by the outdoor electricity consumption measurement.

3. The variable refrigerant flow system of claim 1, further comprising one or more additional outdoor units configured to receive activation requests;
wherein the outdoor meter measures electricity consumption for the first outdoor unit and the one or more additional outdoor units to generate the outdoor unit consumption measurement; and
wherein the variable refrigerant flow management system is further configured to apportion a share of the outdoor unit consumption measurement to the first outdoor unit based on the activation requests.

4. The variable refrigerant flow system of claim 3,
wherein the variable refrigerant flow management system is further configured to apportion a share of the outdoor unit consumption measurement to the first outdoor unit based on the activation requests by:
determining a compressor run time of the first outdoor unit;
determining a compressor total frequency based at least on the compressor request frequencies of the activation requests received by the first outdoor unit;
calculating a consumption factor of the first outdoor unit based at least on the average compressor total frequency and the compressor run time;
calculating a power proportional index for the first outdoor unit by dividing the consumption factor of the first outdoor unit by a sum of consumption factors of the one or more additional outdoor units and the consumption factor of the first outdoor unit; and
multiplying the outdoor unit consumption measurement by the power proportional index.

5. The variable refrigerant flow system of claim 1, further comprising an indoor meter configured to measure electricity consumption of the plurality of indoor units to generate an indoor electricity consumption measurement; and
wherein the variable refrigerant flow management system is further configured to apportion the indoor electricity consumption measurement among the plurality of indoor units.

6. A method for operating a variable refrigerant flow system for a building, comprising:
generating, by a plurality of indoor units for the building, activation requests;
receiving, by a first outdoor unit, the activation requests, wherein the first outdoor unit comprises a compressor;
providing, by the first outdoor unit in response to the activation requests, refrigerant to the plurality of indoor units;
obtaining an outdoor unit electricity consumption measurement and activation data indicating the activation requests, wherein the activation data comprises a compressor request frequency for each of the plurality of indoor units; and
apportioning an outdoor share of the outdoor electricity consumption measurement to each of the plurality of indoor units based on the activation data by calculating an outdoor consumption factor based on the compressor request frequency.

7. The method of claim 6, wherein apportioning an outdoor share of the outdoor electricity consumption measurement to each of the plurality of indoor units based at least on the activation data comprises:
calculating a power proportional index for each indoor unit by dividing the outdoor consumption factor corresponding to the indoor unit by a sum of the outdoor consumption factors for each of the plurality of indoor units; and
multiplying the power proportional index for each indoor unit by the outdoor electricity consumption measurement.

8. The method of claim 6, wherein obtaining the outdoor unit electricity consumption measurement comprises:
measuring electricity consumption for the first outdoor unit and one or more additional outdoor units to generate a total outdoor unit consumption measurement; and
apportioning the outdoor unit consumption measurement to the first outdoor unit as a portion of the total outdoor unit consumption measurement based on the activation data.

9. The method of claim 8,
wherein apportioning the outdoor unit consumption measurement to the first outdoor unit comprises:
determining a compressor run time of the first outdoor unit;
determining a compressor total frequency based on the compressor request frequencies of the activation requests received by the first outdoor unit;
calculating a consumption factor of the first outdoor unit based at least on the compressor total frequency and the compressor run time;
calculating a power proportional index for the first outdoor unit by dividing the consumption factor of the first outdoor unit by a sum of consumption factors of the one or more additional outdoor units and the consumption factor of the first outdoor unit; and
multiplying the total outdoor unit consumption measurement by the power proportional index.

10. The method of claim 6, further comprising obtaining an indoor electricity consumption measurement of the plurality of indoor units; and
apportioning an indoor share of the indoor electricity consumption measurement among the plurality of indoor units.

11. The method of claim 10, wherein attributing each indoor share of the indoor electricity consumption measurement among the plurality of indoor units comprises:
calculating an indoor consumption factor for each indoor unit based at least on a runtime and a capacity corresponding to the indoor unit;
calculating an indoor power proportional index for each indoor unit by dividing the indoor consumption factor corresponding to the indoor unit by the sum of the indoor consumption factors for each of the plurality of indoor units; and
multiplying the power proportional index for each indoor unit by the indoor electricity consumption measurement.

12. The method of claim 10, further comprising:
determining an indoor unit total consumption for each indoor unit by adding the indoor share corresponding to the indoor unit and the outdoor share corresponding to the indoor unit; and generating a total indoor unit charge for each indoor unit by multiplying the indoor unit total consumption corresponding to the indoor unit by an electricity tariff rate.

13. The method of claim 12, further comprising generating an electricity bill for each of a plurality of tenants, each tenant corresponding to one or more of the plurality of indoor units.

14. A system, comprising:
an outdoor meter configured to provide an outdoor electricity consumption measurement of an outdoor unit of a variable refrigerant flow system, the outdoor unit comprising a compressor and configured to provide refrigerant to a plurality of indoor units in response to activation requests from the plurality of indoor units; and
a management system comprising a processing circuit having a memory and processor, the memory structured to store instructions that are executable by the processor and cause the processing circuit to:
receive the outdoor electricity consumption measurement from the outdoor meter;
receive activation data relating to the activation requests, the activation data comprising compressor request frequencies; and
apportion the outdoor electricity consumption measurement among the plurality of indoor units based on the activation data by determining outdoor consumption factors for the plurality of indoor units based on the compressor request frequencies.

15. The system of claim 14, wherein the processing circuit is caused to apportion the outdoor electricity consumption measurement among the plurality of indoor units based on the activation data by:
determining a power proportional index for each of the plurality of indoor units based at least on the outdoor consumption factors; and
multiplying each power proportional index by the outdoor electricity consumption measurement.

16. The system of claim 14, further comprising an indoor meter configured to provide an indoor electricity consumption measurement of the plurality of indoor units, the indoor units further configured to provide runtime data; and wherein the processing circuit is further caused to:
receive the indoor electricity consumption measurement;
receive runtime data relating to the runtimes of the plurality of indoor units;
look up a capacity for each of the plurality of indoor units in a database; and
apportion the indoor electricity consumption measurement among the plurality of indoor units based at least on the runtime data and the capacities.

17. The system of claim 14, wherein the plurality of indoor units are operable to regulate the temperature in various building zones corresponding to various tenants; and wherein the processing system is further caused to generate electricity bills for the various tenants based on the apportioned outdoor electricity consumption measurements.

* * * * *